(12) United States Patent
Lee et al.

(10) Patent No.: US 7,027,105 B2
(45) Date of Patent: Apr. 11, 2006

(54) METHOD AND APPARATUS FOR CHANGING BRIGHTNESS OF IMAGE

(75) Inventors: Seong-deok Lee, Yongin (KR);
Chang-yeong Kim, Yongin (KR);
Yang-seock Seo, Seoul (KR);
Chang-wan Hong, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 561 days.

(21) Appl. No.: 10/337,862

(22) Filed: Jan. 8, 2003

(65) Prior Publication Data

US 2003/0151694 A1    Aug. 14, 2003

(30) Foreign Application Priority Data

| Feb. 8, 2002 | (KR) | ................................. 2002-7439 |
| May 13, 2002 | (KR) | .............................. 2002-26269 |
| Jan. 6, 2003 | (KR) | ..................... 10-2003-0000545 |

(51) Int. Cl.
*H04N 5/57* (2006.01)
(52) U.S. Cl. ...................................... 348/687; 348/673
(58) Field of Classification Search ................ 348/687, 348/689, 673, 678, 679, 708; 382/274; H04N 5/57
See application file for complete search history.

(56) References Cited

U.S. PATENT DOCUMENTS 5,233,385 A    8/1993  Sampsell 5,929,843 A    7/1999  Tanioka
6,434,268 B1*  8/2002  Asamura et al. ............ 382/274
6,845,181 B1*  1/2005  Dupin et al. ................ 382/274

FOREIGN PATENT DOCUMENTS

| EP | 0 606 993 A2 | 7/1994 |
| EP | 0 778 696 A2 | 6/1997 |
| WO | 01/37249 A3 | 5/2001 |

OTHER PUBLICATIONS

European Search Report issued by the European Patent Office on Sep. 28, 2004 in corresponding application 03000482.4-2202.

* cited by examiner

*Primary Examiner*—Sherrie Hsia
(74) *Attorney, Agent, or Firm*—Buchanan Ingersoll PC

(57) ABSTRACT

A method and an apparatus for changing the brightness of an image are provided. The method for changing the brightness of an image includes obtaining a level incremental rate, which denotes the degree to which the brightness of three input color components, i.e., first, second and third color components, will be increased according to a determined color gamut, scaling the input color components using the level incremental rate and determining the results of the scaling as incremental values of the input color components, obtaining a fourth color component value using the incremental values, and obtaining output color components, the brightnesses of which are increased from those of the input color components, using the fourth color component value and the incremental values.

36 Claims, 15 Drawing Sheets

METHOD AND APPARATUS FOR CHANGING BRIGHTNESS OF IMAGE

BACKGROUND OF THE INVENTION

This application claims the priority of Korean Patent Application Nos. 2002-7439, filed on Feb. 8, 2002, and 2002-26269, filed on May 13, 2002, in the Korean Intellectual Property Office, the disclosure of which is incorporated herein in its entirety by reference.

1. Field of the Invention

The present invention relates to an image processor, and more particularly, to a method and an apparatus for adjusting the brightness of an image while maintaining the hue and saturation of the image.

2. Description of the Related Art

As micro-displays, such as a liquid crystal display (LCD), liquid crystal on silicon (LCoS), or a digital micromirror device (DMD), or color displays, such as a plasma display panel (PDP), are widely used for computer monitors or television sets, their markets are getting bigger and bigger. High-power lamps or high-power electrodes have been employed in the displays in order to increase the amount of the output light of a display screen greater than the amount of the output light of a cathode ray tube.

A four-color display, in which an arbitrary color component (hereinafter, referred to as a fourth color component) is added to three conventional color components, referred to as first through third color components, has been developed in order to increase the brightness of an output image without using a high-power lamp or a high-power electrode. The fourth color component can be obtained by either letting light beams of a lamp in the display pass through a filter for a fourth color component (hereinafter, referred to as a fourth filter) or reflecting light beams with the fourth filter. When the fourth filter is a white filter, the brightness of a display can be increased, and thus there is no need to use a high-power lamp or a high-power electrode. Alternatively, if the fourth filter is an arbitrary color filter, the ability to represent colors in the corresponding color gamut can be enhanced, and thus it may be possible to represent colors of high quality in a display. Accordingly, it is necessary to extract a fourth color component from three color components, thus providing four color components.

One of conventional techniques of increasing the brightness of an output image is disclosed in U.S. Pat. No. 5,233,385, "White Light Enhanced Color Field Sequential Projection" to Texas Instruments Incorporated. In this method, a white filter is added to red, green, and blue (R, G, and B) filters. Then, it is possible to enhance the brightness of an output image proportional to the magnitude of a white filter section by a field sequential method, in which a white filter section or a white light frame is added to the R, G, and B filters after spatially dividing a filter section for generating colors by four or temporally dividing a video frame by four. However, even though this method can enhance the brightness of an output image in a display, it can lower the original saturation of pixels of the output image because an increase in the brightness of the output image is done with achromatic components.

There is another conventional technique of changing the brightness of an image, i.e., the disclosure presented in U.S. Pat. No. 5,929,843 "Image Processing Apparatus Which Extracts White Component Data" to Canon Kabushiki Kaisha. According to this method, a white component, which is extracted from each of R, G, and B data and is subjected to a halftone process, is transferred to R, G, and B filters and white display dots when red, green, blue, and white are determined as pixel units in a binary liquid crystal display. This method generates a white component by nonlinearly converting a minimum value among inputted R, G, and B data. In other words, a nonlinear model corresponds to gamma, offset, and scale. In short, this method reinforces a white component of the conventional field sequential method to be possibly applied to each pixel and determines how much a white component is applied to pixels by following a predetermined model. However, this method does not consider any means to maintain the original saturation of output images and to prevent color images from being achromatic due to the increase in the amount of a white component applied to pixels of the images. Accordingly, it is impossible to maintain the saturation of an image when increasing the brightness of an output image.

SUMMARY OF THE INVENTION

The present invention provides a method for changing the brightness of an image, which can increase the brightness of the image while maintaining the hue and saturation of the image.

The present invention provides an apparatus for changing the brightness of an image, which performs the above-mentioned method.

According to an aspect of the present invention, there is provided a method for changing the brightness of an image. The method for changing the brightness of an image includes obtaining a level incremental rate, which denotes the degree to which the brightness of three input color components, i.e., first, second and third color components, will be increased according to a color gamut where a fourth color component belongs, scaling the input color components using the level incremental rate and determining the results of the scaling as incremental values of the input color components, obtaining the fourth color component value using the incremental values, and obtaining output color components, the brightnesses of which are increased from those of the input color components, using the fourth color component value and the incremental values. Here, the level incremental rate is not greater than a first predetermined value.

According to another aspect of the present invention, there is provided an apparatus for changing the brightness of an image. The apparatus includes an incremental rate calculator for calculating a level incremental rate, which corresponds to the degree to which the brightness of three input color components input from the outside, i.e., first, second, and third color components, will be increased, using an available light quantity incremental rate and the three input color components, an incremental value calculator for scaling the three input color components according to the level incremental rate input from the incremental rate calculator and outputting the results of the scaling as incremental values of the input color components, a fourth color component value calculator for calculating a fourth color component value using the incremental values input from the incremental rate calculator and outputting the fourth color component value, and an output color component calculator for calculating output color components, the brightness of which is increased from that of the three input color components, using the incremental values and the fourth color component value and outputting the output color components.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, a method and an apparatus for changing the brightness of an image according to the present invention will be described in greater detail with reference to the accompanying drawings.

Figure 1:
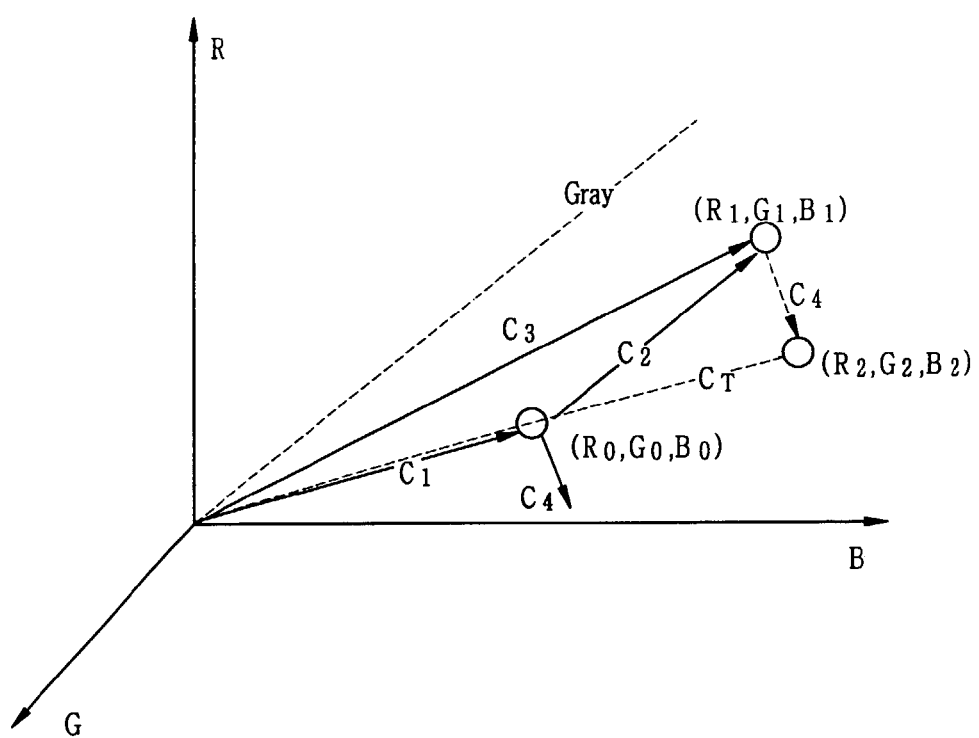
FIG. 1 is a diagram illustrating three input color components, i.e., first through third color components (for example, R, G, and B) in a three-dimensional color space.
Figure 2:
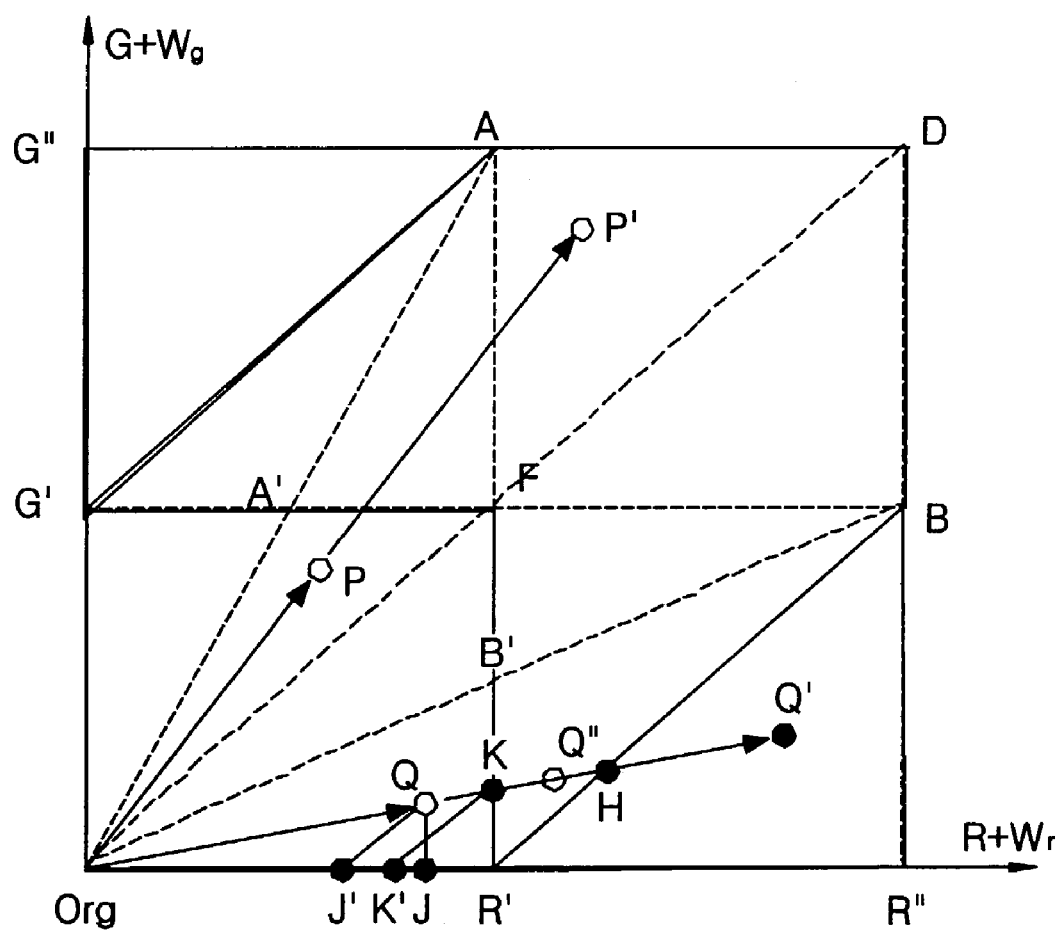
FIG. 2 is a diagram illustrating first through fourth color components, for example, R, G, B, and W, in a two-dimensional space using RG and W.

FIG. 1 is a diagram illustrating three input color components, i.e., first through third color components, for example, R, G, and B, in a three-dimensional color space, and FIG. 2 is a diagram illustrating first through fourth color components, for example, R, G, B, and W, (here, W represents a fourth color component) in a two-dimensional space using R, G and W. In FIG. 2, the X-axis corresponds to the sum of R and Wr, which is the result of projecting W onto an R-axis in a three-dimensional color space comprised of R, G, and B axes. The Y-axis corresponds to the sum of G and Wg, which is the result of projecting W onto the G-axis in the three dimensional color space of the R, G, and B axes. For example, a fourth color component W can be expressed by the sum of the vector of R, G, and B and can be defined by W={Wr, Wg, Wb}. Here, Wb denotes the result of projecting W onto the B-axis in the three-dimensional color space of the R, G, and B axes.

In order to freely change the brightness of an image while maintaining the saturation of the image, the method and apparatus for changing the brightness of an image according to the present invention adopts a four-color processing method. The sum of two arbitrary color signals $C_1$ and $C_2$ can be expressed as a scalar product of the two vectors of the color signals by the following equation.

$$C_3(\text{mag}_3, U\text{vec}_3) = C_1(\text{mag}_1, U\text{vec}_1) \text{Dot} C_2(\text{mag}_2, U\text{vec}_2) \quad (1)$$

Here, $C_i (1 < i < 3)$ denotes a color signal, $\text{mag}_i$ denotes the magnitude of the color signal, $U\text{vec}_i$ denotes the direction vector of the color signal, and Dot denotes a scalar product.

In FIG. 1, in order to increase the light quantity of an input color signal $C_1$ of an image, a fourth color signal $C_2$ is mixed with the input color signal $C_1$, thus generating a mixed color $C_3$. The mixed color $C_3$ has a direction vector different from that of the input color signal $C_1$. Since the input color signal $C_1$ changes with the increase in the light quantity, there is a need to correct the mixed color $C_3$ to have the same vector as the original input color signal $C_1$. Specifically, in order to obtain a target vector $C_T$, which is the same as the direction vector of the input color signal $C_1$ of the input image and has an enhanced brightness, the scalar product of the fourth color signal $C_2$ and a compensated vector component $C_4$ can be expressed by the following equation.

$$C_T(\text{mag}_T, U\text{vec}_T) = C_1(\text{mag}_1, U\text{vec}_1) \text{Dot}\{C_2(\text{mag}_2, U\text{vec}_2) \text{Dot} C_4(\text{mag}_4, U\text{vec}_4)\} \quad (2)$$

The magnitude $(\text{mag}_4)$ and direction vector $(U\text{vec}_4)$ of the compensated vector component $C_4$ are the function of the magnitude $(\text{mag}_1)$ and direction vector $(U\text{vec}_1)$ of the input color signal $C_1$, respectively, and the magnitude $(\text{mag}_2)$ and direction vector $(U\text{vec}_2)$ of the fourth color signal $C_2$, respectively. Accordingly, if either the magnitude $(\text{mag}_1)$ or direction vector $(U\text{vec}_1)$ of the input color signal $C_1$ or either the magnitude $(\text{mag}_2)$ or direction vector $(U\text{vec}_2)$ of the fourth color signal $C_2$ varies, the magnitude $(\text{mag}_4)$ and direction vector $(U\text{vec}_4)$ of the compensated vector component $C_4$ vary.

Here, Equation (2) can hardly be a sufficient condition for naturally representing colors of the input image $C_1$ with four colors. Accordingly, the value of the fourth color component must be determined in consideration of the color gamut shown in FIG. 2, and the reason is that a four-color gamut is not a color gamut represented as a cube having R, G, and B color spaces but a color gamut represented as a solid having up to 10 faces.

Supposing an input color gamut is represented as a square Org-R'-F-G', as shown in FIG. 2, an output color gamut is represented as a hexagon Org-G'-A-D-B-R'. Here, the inside of triangles G'-G"-A and B-R'-R" cannot be represented with color components.

In FIG. 2, when multiplied by a constant value, the magnitude of each input color component inside a square Org-A'-F-B' can be enhanced while their direction vectors are maintained. However, when a color component is moved outside the square Org-A'-F-B' from the inside after increasing the magnitude of the color component, the color component having an increased magnitude may be mapped outside the color space, when the color component is multiplied by a constant value.

Accordingly, in order to increase the brightness of an input color component in a quadrangle Org-R'-F-G' within a possible range while maintaining the direction vector of the input color component, it is necessary to process colors in triangles Org-G'-A' and Org-R'-B', separately from the colors in the quadrangle Org-A'-F-B'. In addition, it is necessary to adjust the incremental ratio or quantity of the corresponding color according to a component ratio or coordinates of the corresponding color in order for the increased values of colors inside the triangles Org-G'-A' and Org-R'-B' to exist in a possible color range which can be represented.

The ratio of the side of the square Org-A'-F-B' to the side of the square A-D-B-F is determined depending on the ratio $L_S$ of the output light quantity of the fourth color component to the output light quantity of the first through third color components, i.e., the output light quantity of R, G, and B components. Hereinafter, the ratio $L_S$ will be referred to as a light quantity incremental rate. The square Org-A'-F-B' is a color gamut represented by the output light quantity of the R, G, and B components, while a square A-D-B-F is a color gamut represented by the output quantity of the fourth color component. The two triangles Org-G'-A' and Org-R'-B' are color gamuts represented by a mixed color of the fourth color component and the R, G, and B components. The light quantity incremental rate $L_S$ can be expressed by the following equation.

$$L_S = \{L_{S\_r}, L_{S\_g}, L_{S\_b}\} \quad (3)$$

$$L_{S\_r} = \left\{ \frac{E_{W\_r}}{E_r + E_g + E_b}, \right.$$

$$L_{S\_g} = \frac{E_{W\_g}}{E_r + E_g + E_b},$$

$$L_{S\_b} = \frac{E_{W\_b}}{E_r + E_g + E_b}$$

Here, the light quantity incremental rate $L_S$ may be represented with the light quantity incremental rate $L_{S\_r}$, $L_{S\_g}$, and $L_{S\_b}$ of each of the R, G, and B components, which will be referred to as a component light quantity incremental rate from now on. $E_r$, $E_g$, $E_b$, and $E_W$ denote the light intensities of an R-channel, a G-channel, a B-channel, and a fourth color channel, respectively, output from the display. $E_{W\_r}$, $E_{W\_g}$, and $E_{W\_b}$ denote the light intensities of R, G, and B components, respectively, which can be obtained by vector-decomposing the output light intensity $E_W$ of the fourth color channel by three color components, for example, the R, G, and B components. For example, let it be assumed that the output light intensities of the R, G, and B channels output from a display are 100, i.e., $E_r=E_g=E_b=100$, and the light intensities $E_{W\_r}$, $E_{W\_g}$, and $E_{W\_b}$ of the R, G, and B components, respectively, of light beams output through the fourth color channel, which are obtained by decomposing the output light intensity $E_W$ of the fourth color channel by the three components, are 40, 50, and 60, respectively. Then, the component light intensity incremental rates $L_{S\_r}$, $L_{S\_g}$, and $L_{S\_b}$ of the R, G, and B components become 0.4, 0.5, and 0.6, respectively. In this case, referring to FIG. 2, the ratio of the length of a segment Org-R' of the square Org-R'-F-G' with respect to the length of a segment F-B of the square A-D-B-F is 1:0.4, and the ratio of the length of segment Org-G' with respect to the length of segment F-A is 1:0.5.

Figure 3:
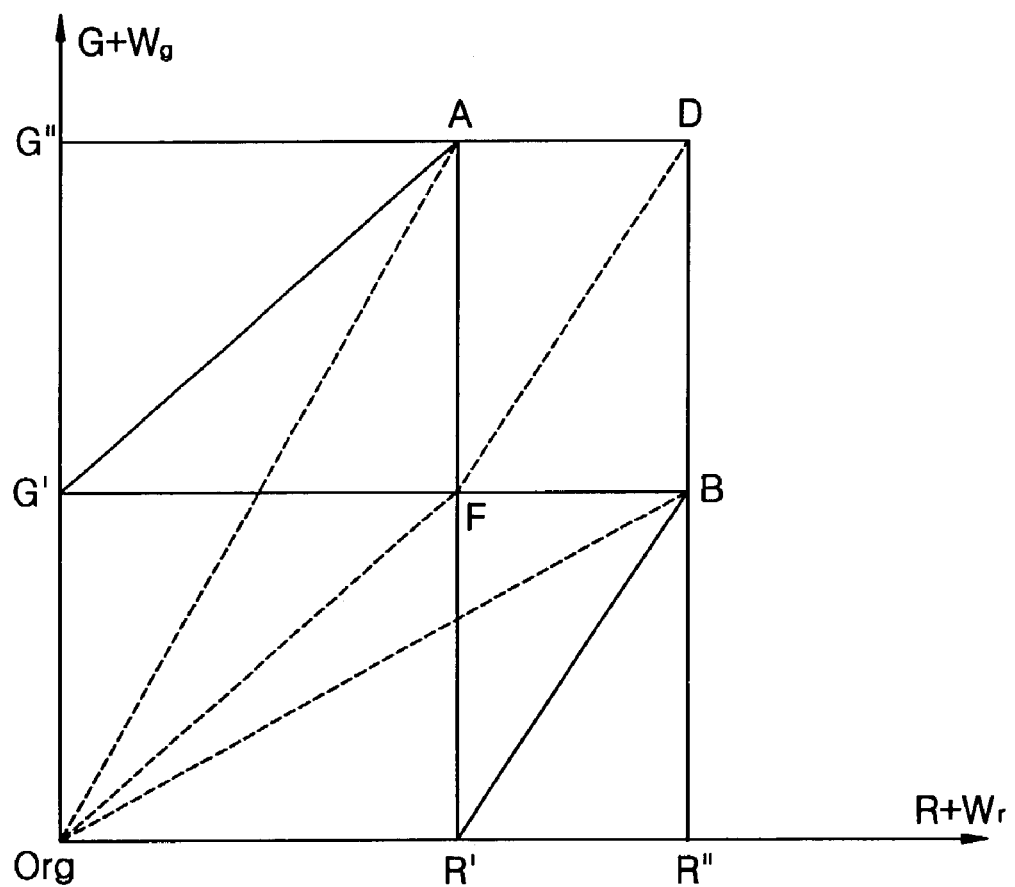
FIG. 3 is another diagram illustrating first through fourth color components, for example, R, G, B, and W, in a two-dimensional space using RG and W.

FIG. 3 is a diagram illustrating four color components, for example, R, G, B, and W, in a two-dimensional space using R, G and W.

If the decomposed intensities $E_{W\_r}$, $E_{W\_g}$, and $E_{W\_b}$ of the R, G, and B components, respectively, of the fourth color channel are different from one another, $W_r$ of FIG. 2, which is the length of a segment F-B, is different from $W_g$, which is the length of segment F-A, and the shape of the color gamut where the fourth color component possibly belongs may be different. FIG. 3 is a two-dimensional diagram illustrating the varied shape of the color gamut where the fourth color component possibly belongs.

Hereinafter a method for changing the brightness of an image according to the present invention will be described with reference to the accompanying drawings.

Figure 4:
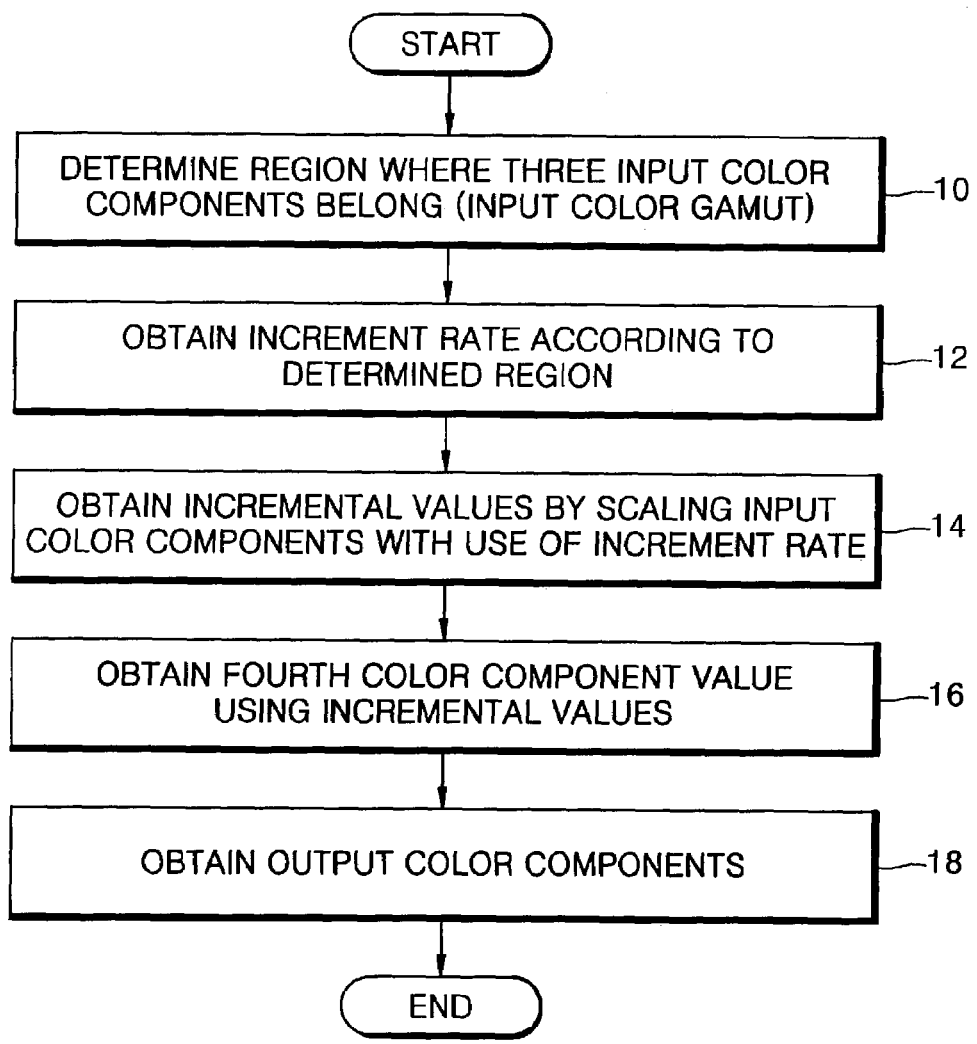
FIG. 4 is a flowchart of a method for changing the brightness of an image according to the present invention.

FIG. 4 is a flowchart of a method for changing the brightness of an image according to the present invention, which includes scaling input color components using a level incremental rate obtained based on the color gamut where the input color components belong, in steps 10 through 14 and obtaining a fourth color component value and output color components in steps 16 through 18 using incremental values $R_2$, $G_2$, and $B_2$.

Referring to FIG. 4, a gamut where three input color components including first through third color components belong is determined among the color gamuts shown in FIG. 2 in step 10. Here, the three input color components are color signals which are generally used in image processing and may denote R, G, and B, or brightness Y, and color difference signals CrCb. Alternatively, the three input color components may denote brightness Y and color difference signals I and Q, or hue, lightness, and saturation (HLS). Alternatively, the three input color components may denote brightness Y and color difference signals CIELAB and CIELUV, which are adopted by the Commission Internationale de l'Eclairage. Hereinafter, let us assume that the three input color components denote R, G, and B in order to help the understanding of the present invention.

After step 10, a level incremental rate $S_1$ is obtained according to the color gamut where the input color components $R_0$, $G_0$, and $B_0$ belong in step 12. Here, the level incremental rate S1 denotes the degree to which the brightness of each of the input color components $R_0$, $G_0$, and $B_0$ in a certain color gamut will be increased. According to the present invention, the gamut where the input color components $R_0$, $G_0$, and $B_0$ belong and the amount by which the brightness of the input color components will be increased may be determined in consideration of the light quantity incremental rate $L_S$. Here, the light quantity incremental rate $L_s$ may be determined by Equation (3) or may be set up at an arbitrary value, for example 1. Alternatively, the light quantity incremental rate $L_s$ may be set up at a predetermined value which can be varied in advance.

Figure 5:
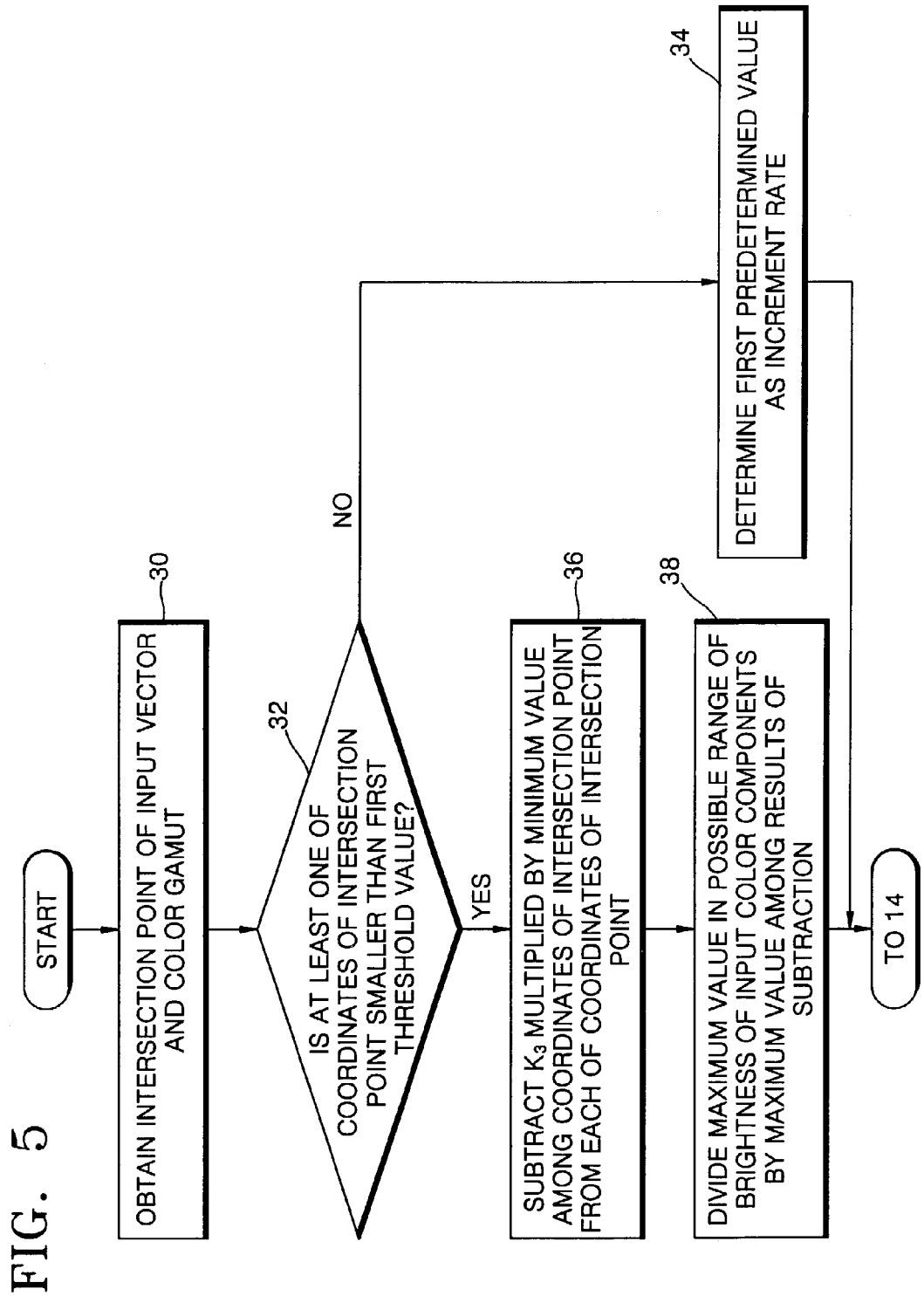
FIG. 5 is a flowchart of a preferred embodiment of steps 10 and 12 of the method for changing the brightness of an image, as shown in FIG. 4.

FIG. 5 is a flowchart of a preferred embodiment of steps 10 and 12 shown in FIG. 4 according to the present invention, which includes determining which region input color components belong to in steps 30 and 32 and obtaining a level incremental rate in step 34 through 38.

According to an embodiment of the present invention, an intersection point $(R_3, G_3, B_3)$ of an extended line of the input vector having the input color components $R_0, G_0,$ and $B_0$ and the boundary of the gamut where the input color components $R_0, G_0,$ and $B_0$ belong (the input color gamut), i.e., the corresponding side of square Org-R'-F-G' can be obtained from the following equations in step 30.

$$R_3 = \frac{k_1}{M_1} \times R_0 \quad G_3 = \frac{k_1}{M_1} \times G_0 \quad B_3 = \frac{k_1}{M_1} \times B_0 \quad (4)$$

Here, $M_1$ denotes a maximum value among the input color components $R_0, G_0,$ and $B_0$, and $k_1$ refers a maximum value in the possible range of the brightness of any of the input color components $R_0, G_0,$ and $B_0$. For example, $k_1$ may be 255. Intersection point $(R_3, G_3, B_3)$ may exist on the segment G'-F or F-R' shown in FIG. 2. If the input color components $R_0, G_0,$ and $B_0$ correspond to point Q, the intersection point $(R_3, G_3, B_3)$ corresponds to point K.

After step 30, it is determined whether or not at least one of the coordinates of the intersection point $(R_3, G_3, B_3)$ is smaller than a first threshold value in step 32. According to the present invention, the first threshold value can be expressed by the following equation.

$$\text{First threshold value} = \frac{k_1}{1 + K_3} \quad (5)$$

Here, $K_3$ represents a maximum or minimum value among the component light quantity incremental rates $L_{S\_r}$, $L_{S\_g}$, and $L_{S\_b}$ defined by Equation (3) and will be referred to as an available light quantity incremental rate in the following. For example, if the available light quantity incremental rate $K_3$ is 1 and $k_1=255$, the first threshold value can be 127. Here, if at least one of the coordinates of the intersection point $(R_3, G_3, B_3)$ is smaller than the first threshold value, the input color components $(R_0, G_0, B_0)$ belong to a first scaling space, which is not a fixed space, in other words, they belong to the triangles Org-G'-A' and Org-R'-B' shown in FIG. 2. However, if none of the coordinates of the intersection point $(R_3, G_3, B_3)$ is smaller than the first threshold value, the input color components $(R_0, G_0, B_0)$ belong to a second scaling space, which is a fixed space, in other words, they belong to the square Org-A'-F-B' shown in FIG. 2.

If at least one of the coordinates of the intersection point $(R_3, G_3, B_3)$ is considered smaller than the first threshold value, the results of multiplying a minimum value among the coordinates of the intersection point $(R_3, G_3, B_3)$ by the available light quantity incremental rate $K_3$ are subtracted from each of the coordinates of the intersection point $(R_3, G_3, B_3)$ in step 36, which is shown in the following equation.

$$R_4 = R_3 - K_3 \times \text{Min}(R_3, G_3, B_3) \quad (6)$$
$$G_4 = G_3 - K_3 \times \text{Min}(R_3, G_3, B_3)$$
$$B_4 = B_3 - K_3 \times \text{Min}(R_3, G_3, B_3)$$

Here, $R_4, G_4,$ and $B_4$ denote the results of the subtraction, and $\text{Min}(R_3, G_3, B_3)$ denotes a minimum value among $R_3, G_3,$ and $B_3$.

After step 36, the maximum brightness value $k_1$ of any of the input color components $R_0, G_0,$ and $B_0$ is divided by a maximum value among $R_4, G_4,$ and $B_4$, which is shown in Equation (7). The result of the division is determined as a level incremental rate $S_1$ in step 38 and the method moves on to step 14.

$$S_1 = \frac{k_1}{\text{Max}(R_4, G_4, B_4)} \quad (7)$$

Here, $\text{Max}(R_4, G_4, B_4)$ denotes the maximum value among $R_4, G_4,$ and $B_4$.

However, if none of the coordinates of the intersection point $(R_3, G_3, B_3)$ is smaller than the first threshold value, the first threshold value is determined as the level incremental rate $S_1$ in step 34, and the method moves on to step 14. Here, a first predetermined value $K_4$ is the sum of 1 and the available light quantity incremental rate $K_3$. Here, the available light quantity increase ratio $K_3$ is a predetermined value, and the first predetermined value $K_4$ is determined in advance. Here, the level incremental rate is not greater than a first predetermined value.

Figure 6:
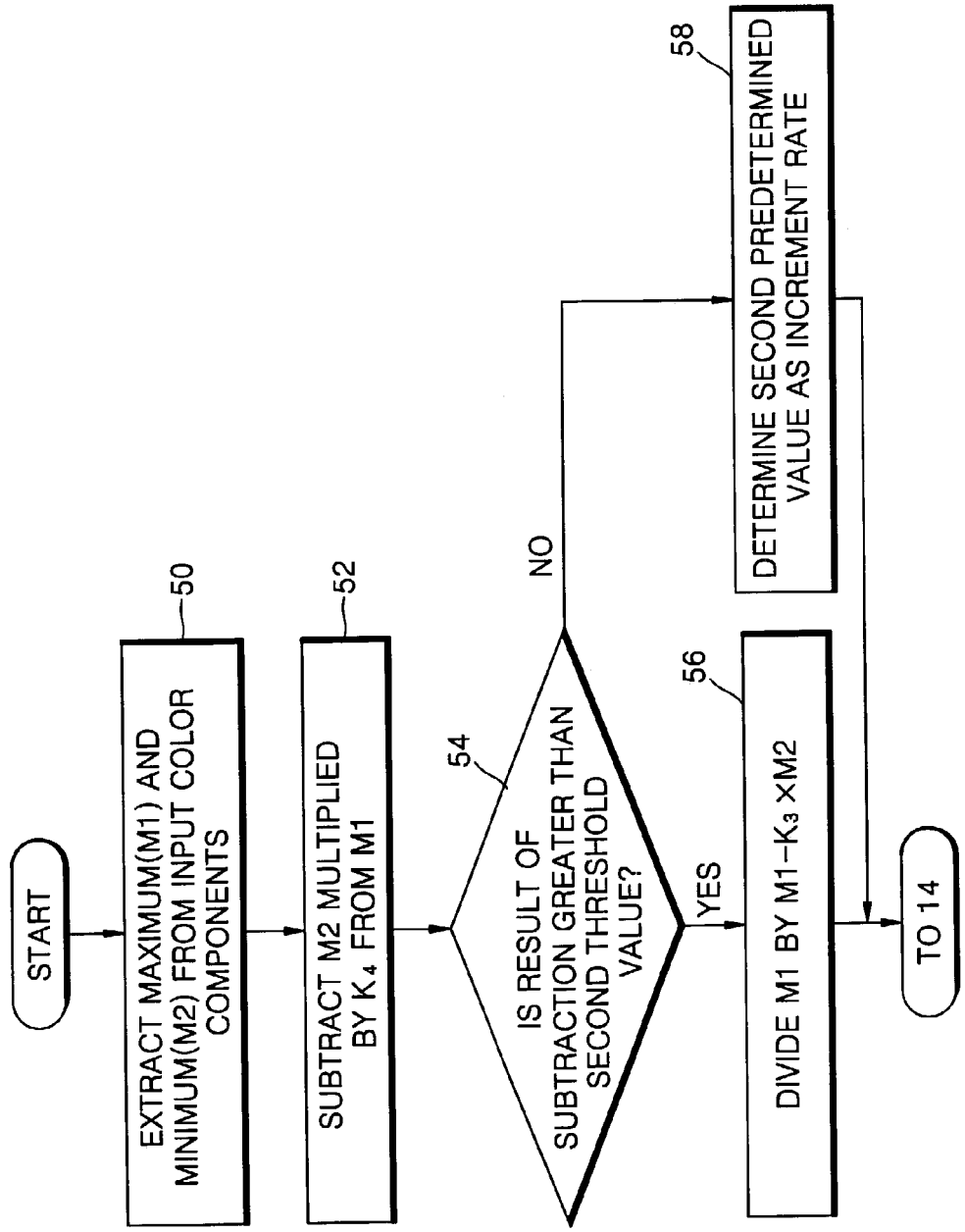
FIG. 6 is a flowchart of another preferred embodiment of steps 10 and 12 of the method for changing the brightness of an image, as shown in FIG. 4.

FIG. 6 is a flowchart of another embodiment of steps 10 and 12 shown in FIG. 4 according to the present invention, which includes determining a gamut where input color components belong in steps 50 through 54 and obtaining a level incremental rate in steps 56 and 58.

According to another embodiment of the present invention, a maximum value M1 and a minimum value M2 among the input color components $R_0, G_0,$ and $B_0$ are extracted in step 50. After step 50, the result of multiplying the minimum value M2 by $K_4$ is subtracted from the maximum value M1 in step 52. After step 52, it is determined whether or not the result of the subtraction is greater than a second threshold value in step 54. For example, the second threshold value may be 0. Here, the result of the subtraction is greater than the second threshold value, the input color components $R_0$, $G_0$, and $B_0$ belong to the first scaling space. However, if the result of the subtraction is no greater than the second threshold value, the input color components $R_0, G_0,$ and $B_0$ belong to the second scaling space.

If the result of the subtraction is considered greater than the second threshold value, the ratio of the result of the subtraction (M1−K$_3$M2) with respect to the maximum value M1 is calculated by following Equation (8), and then the calculated ratio is determined as the level incremental rate $S_1$ in step 56, and the method moves on to step 14.

$$S_1 = \frac{M1}{M1 - K_3 \times M2} \quad (8)$$

However, if the result of subtracting the minimum value M2 multiplied by $K_4$ from the maximum value M1 is not greater than the second threshold value, a second predetermined value is determined as the level incremental rate $S_1$ in step 58, and the method moves on to step 14. Here, the second predetermined value is determined independently of the input color components $R_0$, $G_0$, and $B_0$ and is equal to the first predetermined value $K_4$.

When the input color components $R_0$, $G_0$, and $B_0$ belong to the first scaling space, the level incremental rate $S_1$ is obtained according to the input color components $R_0$, $G_0$, and $B_0$. On the other hand, when the input color components $R_0$, $G_0$, and $B_0$ belong to the second scaling space, the level incremental rate $S_1$ is obtained independently of the input color components $R_0$, $G_0$, and $B_0$.

According to the present invention, the method for changing the brightness of an image shown in FIG. 4 may not include step 10, in which case the level incremental rate is obtained according to a color gamut where a fourth color component belongs in step 12.

After step 12, the input color components $R_0$, $G_0$, and $B_0$ are scaled using the level incremental rate $S_1$, and the results of the scaling are determined as the incremental values $R_2$, $G_2$, and $B_2$ of the input color components $R_0$, $G_0$, and $B_0$ in step 14.

According to an embodiment of the present invention, after step 12, the input color components $R_0$, $G_0$, and $B_0$ are multiplied by the level incremental rate $S_1$, and the results of the multiplication are determined as the incremental values $R_2$, $G_2$, and $B_2$ in step 14, as shown in Equation (9). Then, the method moves on to step 16.

$$R_2 = S_1 \times R_0 \quad (9)$$
$$G_2 = S_1 \times G_0$$
$$B_2 = S_1 \times B_0$$

Accordingly, it is possible to increase the magnitude of each of the input color components $R_0$, $G_0$, and $B_0$ while maintaining the direction vector of each of the input color components $R_0$, $G_0$, and $B_0$ by multiplying the input color components $R_0$, $G_0$, and $B_0$, as shown in Equation (9), by the level incremental rate $S_1$ when the input color components $R_0$, $G_0$, and $B_0$ belong to the second scaling space. For example, in the case of using Equation (9) above, point P shown in FIG. 2, which corresponds to the input color components $R_0$, $G_0$, and $B_0$, becomes point P' which corresponds to the incremental values $R_2$, $G_2$, and $B_2$.

On the other hand, if the input color components $R_0$, $G_0$, and $B_0$ belong to the first scaling space, the level incremental rate $S_1$ can be obtained from Equation (10) using intersection point $IP_1$ of the vector of the input color components and the boundary of the input color gamut and intersection point $IP_2$ of the vector of the input color components $R_0$, $G_0$, and $B_0$ and the boundary of an output color gamut. Here, a line extended along the direction of the vector of the input color components $R_0$, $G_0$, and $B_0$ passes the intersection point $IP_1$ and intersection point $IP_2$.

$$S_1 = \frac{IP_2}{IP_1} \quad (10)$$

Here, referring to FIG. 2, the intersection point $IP_1$ corresponds to point K ($R_3$, $G_3$, $B_3$), and the intersection point $IP_2$ corresponds to point H. According to Equation (10), the level incremental rate $S_1$ is determined depending on the ratio of the length of a segment Org-H with respect to the length of a segment Org-K. As shown in FIG. 2, segment K-K' and segment R'-B have the same slope. Accordingly, the ratio of the length of the segment Org-H corresponding to the intersection point $IP_2$ with respect to the length of the segment Org-K corresponding to the intersection point $IP_1$ is the same as the ratio of the length of a segment Org-R' with respect to the length of a segment Org-K'. Here, point K' corresponds to ($R_4$, $G_4$, $B_4$). Point Q" in the output color gamut can be obtained by multiplying point Q by the level incremental rate $S_1$ when the input color signals $R_0$, $G_0$, and $B_0$ correspond to point Q.

Points J and J' can be used instead of point K' in order to compute the level incremental rate $S_1$. As shown in FIG. 2, segments K-K' and R'-B have the same slope as a segment Q-J'. Accordingly, the ratio of the length of the segment Org-H with respect to the length of the segment Org-K is the same as the ratio of the length of a segment Org-J with respect to the length of a segment Org-J'. Here, point J corresponds to M1 in Equation (8), and J' corresponds to M1−K$_3$M2 in Equation (8). Point Q" in the output color gamut can be obtained by multiplying point Q by the level incremental rate $S_1$ when the input color signals $R_0$, $G_0$, and $B_0$ correspond to point Q.

In the meantime, referring to Equation (9), the incremental values $R_2$, $G_2$, and $B_2$ obtained in step 14 are the results of increasing the brightness of the input color components $R_0$, $G_0$, and $B_0$, which means that the incremental values $R_2$, $G_2$, and $B_2$ practically include a fourth color component. After step 14, the value $W_{out}$ of the fourth color component is obtained using the incremental values $R_2$, $G_2$, and $B_2$ in step 16. An embodiment of step 16 according to the present invention will be described in the following.

Figure 7:
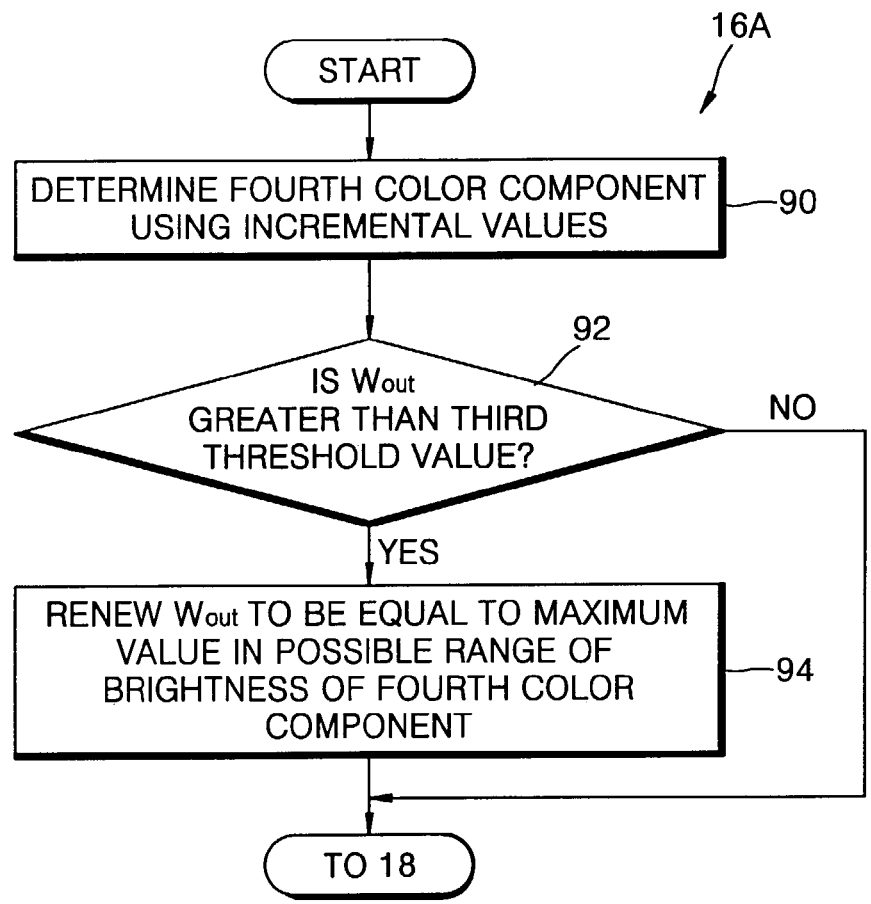
FIG. 7 is a flowchart of a preferred embodiment of step 16 of the method for changing the brightness of an image, as shown in FIG. 4.

FIG. 7 is a flowchart of an embodiment 16A of step 16 shown in FIG. 4 according to the present invention, which includes determining a certain value related to the incremental values $R_2$, $G_2$, and $B_2$ as the value $W_{out}$ of the fourth color component in step 90 and renewing the fourth color component value $W_{out}$ depending on whether or not it is greater than the maximum value $k_2$ in the possible range of the brightness of a fourth color component in steps 92 and 94.

After step 14, the certain value $W_m$ related to the incremental values $R_2$, $G_2$, and $B_2$ is determined as the fourth color component value $W_{out}$ in step 90. Here, the certain value $W_m$ may be a minimum value among the incremental values $R_2$, $G_2$, and $B_2$ or a weighted minimum value. Alternatively, the certain value $W_m$ may be the result of subtracting the maximum value, for example, 255, in the possible range of the brightness of any of the input color components $R_0$, $G_0$, and $B_0$, for example 255, from a maximum value among the incremental values $R_2$, $G_2$, and $B_2$, for example, 511 in a case where $K_4$=1. Alternatively, the certain value $W_m$ may be the average of the minimum among the incremental values $R_2$, $G_2$, and $B_2$ and the result of subtracting the maximum value in the possible range of the brightness of any of the input color components $R_0$, $G_0$, and $B_0$ from the maximum value among the incremental values $R_2$, $G_2$, and $B_2$. The certain value $W_m$ related to the incremental values $R_2$, $G_2$, and $B_2$ can be defined by the following equation.

$$W_m = \frac{(a_1 M_8 + a_2 M_9)}{a_3} \qquad (11)$$

Here, $M_8$ corresponds to the minimum value among the incremental values $R_2$, $G_2$, and $B_2$, and $M_9$ corresponds to the result of subtracting the maximum value in the possible range of the brightness of any of the input color components $R_0$, $G_0$, and $B_0$ from the maximum value among the incremental values $R_2$, $G_2$, and $B_2$. Coefficients $a_1$, $a_2$, and $a_3$ correspond to weights.

After step 90, it is determined whether or not the fourth color component value $W_{out}$ is greater than a third threshold value in step 92. Here, the third threshold value is the maximum value $k_2$ in the possible range of the brightness of the fourth color component and is determined by the available light quantity incremental rate $K_3$.

If the fourth color component value $W_{out}$ is not greater than the third threshold value, the method moves on to step 18. However, if the fourth color component value $W_{out}$ is greater than the maximum value $k_2$ in the possible range of the brightness of the fourth color component, i.e., the third threshold value, the fourth color component value is renewed with the maximum value $k_2$ in the possible range of the brightness of the fourth color component and then the method moves on to step 18, in step 94. For example, if $K_3=1$, the third threshold value is equal to 255.

After step 16, output color components $R_{out}$, $G_{out}$, and $B_{out}$, which correspond to the results of increasing the brightness of the input color components $R_0$, $G_0$, and $B_0$, are obtained using the fourth color component value $W_{out}$ and the incremental values $R_2$, $G_2$, and $B_2$ in step 18.

According to an embodiment of the present invention, if the fourth color component obtained from the three input color components $R_0$, $G_0$, and $B_0$ is the same as the fourth color component displayed at the fourth color channel, after step 16, the fourth color component value $W_{out}$ is subtracted from the incremental values $R_2$, $G_2$, and $B_2$, which is shown in Equation (12) below, and the results of the subtraction are determined as the output color components $R_{out}$, $G_{out}$, and $B_{out}$ in step 18.

$$R_{out} = R_2 - W_{out} \qquad (12)$$
$$G_{out} = G_2 - W_{out}$$
$$B_{out} = B_2 - W_{out}$$

Equation (12) represents the output color components $R_{out}$, $G_{out}$, and $B_{out}$ in the event that mixture ratios $R_a$, $G_a$, and $B_a$ of the input color components $R_0$, $G_0$, and $B_0$ are the same as.

However, another embodiment of step 18 shown in FIG. 4 according to the present invention can be can be explained as follows, when the fourth color component obtained from the three input color components $R_0$, $G_0$, and $B_0$ is not the same as the fourth color component displayed at the fourth color channel but an arbitrary color component, in other words, when at least one of the light intensities $E_{W\_r}$, $E_{W\_g}$, and $E_{W\_b}$ of the three input color components $R_0$, $G_0$, and $B_0$ of light beams output through the fourth color channel is different from the others. Here, $E_{W\_r}$, $E_{W\_g}$, and $E_{W\_b}$ are obtained by decomposing the intensity $E_W$ of light beams output through the fourth color channel by the three input color components $R_0$, $G_0$, and $B_0$.

Figure 8:
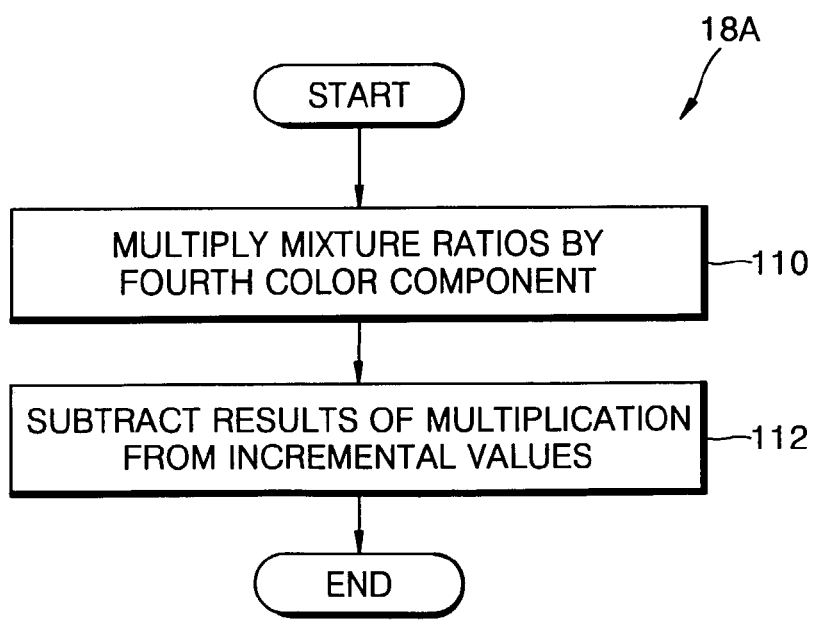
FIG. 8 is a flowchart of a preferred embodiment of step 18 of the method for changing the brightness of an image, as shown in FIG. 4.

FIG. 8 is a flowchart of another embodiment 18A of step 18 shown in FIG. 4 according to the present invention, which includes subtracting the results of multiplying the mixture ratios $R_a$, $G_a$, and $B_a$ by the fourth color component value $W_{out}$ from the incremental values $R_2$, $G_2$, and $B_2$ in steps 110 and 112.

After step 16, the intensity $E_W$ of light beams output through the fourth color channel is vector-decomposed by the three input color components $R_0$, $G_0$, and $B_0$. Then, the mixture ratios $R_a$, $G_a$, and $B_a$, which are obtained from the ratios of $E_{W\_r}$, $E_{W\_g}$, and $E_{W\_b}$ with respect to either a maximum or a minimum among $E_{W\_r}$, $E_{W\_g}$, and $E_{W\_b}$, are multiplied by the fourth color component value $W_{out}$ in step 110. Here, the mixture ratios $R_a$, $G_a$, and $B_a$ can be defined by the following equation.

$$R_a = b_1 \frac{E_{W\_r}}{F(E_{W\_r}, E_{W\_g}, E_{W\_b})} \qquad (13)$$
$$G_a = b_2 \frac{E_{W\_g}}{F(E_{W\_r}, E_{W\_g}, E_{W\_b})}$$
$$B_a = b_3 \frac{E_{W\_b}}{F(E_{W\_r}, E_{W\_g}, E_{W\_b})}$$

Here, $F(a, b, c)$ means a maximum or a minimum among $a$, $b$, and $c$, and coefficients $b_1$, $b_2$, and $b_3$ are weights.

After step 110, the results of the multiplication performed in step 110 are subtracted from the incremental values $R_2$, $G_2$, and $B_2$, and the results of the subtraction are determined as the output color components $R_{out}$, $G_{out}$, and $B_{out}$ in step 112. The output color components $R_{out}$, $G_{out}$, and $B_{out}$ obtained following the embodiment 18A of FIG. 8 of the present invention can be expressed by the following equation.

$$R_{out} = R_2 - W_{out} \times R_a \qquad (14)$$
$$G_{out} = G_2 - W_{out} \times G_a$$
$$B_{out} = B_2 - W_{out} \times B_a$$

Hereinafter, the structure and operation of an apparatus for changing the brightness of an image, which performs the method for changing the brightness of an image according to the present invention, will be described in greater detail with reference to the accompanying drawings.

Figure 9:
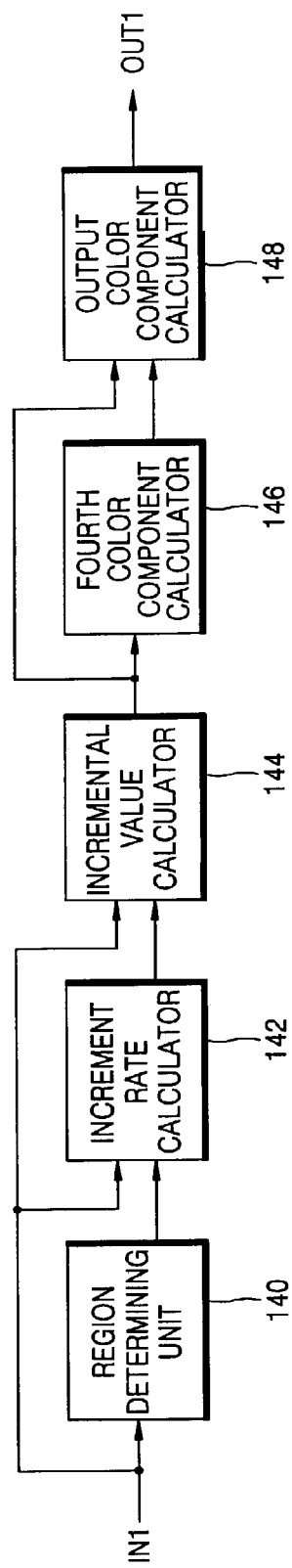
FIG. 9 is a block diagram of an apparatus for changing the brightness of an image according to the present invention.

FIG. 9 is a block diagram of an apparatus for changing the brightness of an image according to the present invention. The apparatus for changing the brightness of an image includes a region determining unit 140, an incremental rate calculator 142, an incremental value calculator 144, a fourth color component value calculator 146, and an output color component calculator 148.

The region determining unit 140 determines a region where the three input color components $R_0$, $G_0$, and $B_0$, which are input from the outside via an input terminal IN1, belong, among the color regions of the color gamut shown in FIG. 2, and then outputs the result of the determination to the incremental rate calculator 142 as a first control signal C1, in order to perform step 10 shown in FIG. 4. The region determining unit 140 may determine the region where the input color components $R_0$, $G_0$, and $B_0$ belong, based on the available light quantity incremental rate $K_3$ input from the outside through an input terminal IN1.

The incremental rate calculator 142 calculates the level incremental rate $S_1$ in response to the first control signal C1 input from the region determining unit 140 using the input color components $R_0$, $G_0$, and $B_0$ input through the input terminal IN1 and outputs the result $S_1$ of the calculation to the incremental value calculator 144, in order to perform step 12 shown in FIG. 4. Here, the incremental rate calculator 142 may calculate the level incremental rate $S_1$ based on the available light quantity incremental rate $K_3$.

Hereinafter, the structures and operations of embodiments of the region determining unit 140 and the incremental rate calculator 142 which are shown in FIG. 9 will be described.

Figure 10:
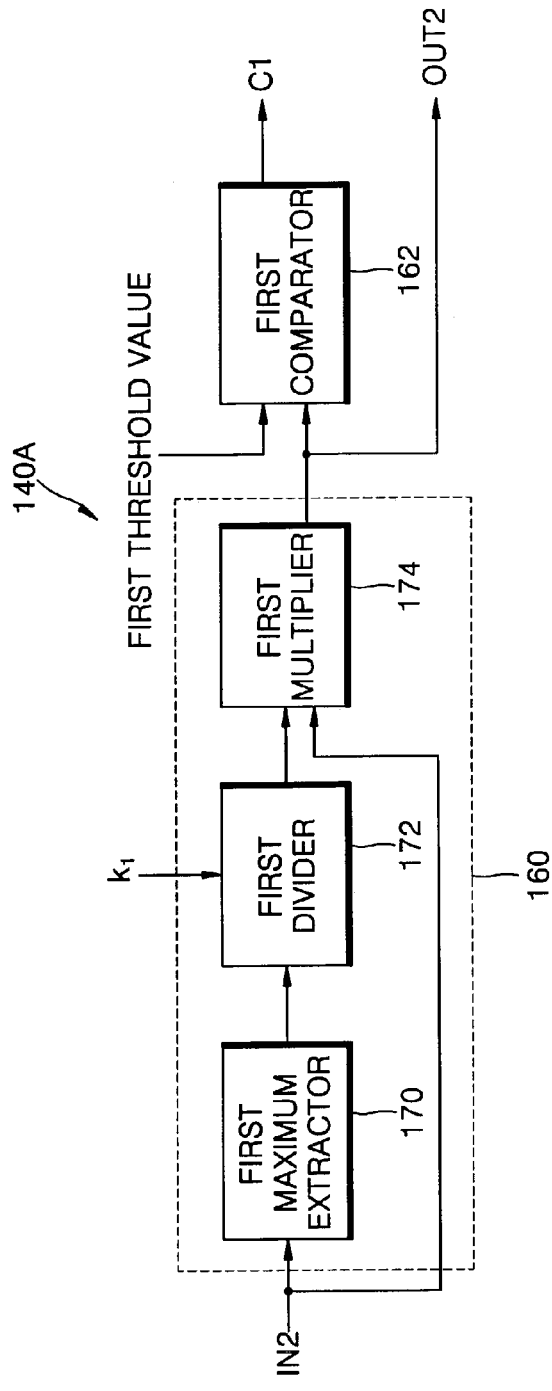
FIG. 10 is a block diagram of a preferred embodiment of the region determining unit shown in FIG. 9 according to the present invention.

FIG. 10 is a block diagram of a preferred embodiment 140A of the region determining unit 140 according to the present invention. Referring to FIG. 10, the region determining unit 140A includes an intersection calculator 160 and a first comparator 162.

The intersection calculator 160 calculates the intersection point $(R_3, G_3, B_3)$ of an input vector representing the input color components $R_0$, $G_0$, and $B_0$ and the boundary of a color gamut based on the input color components $R_0$, $G_0$, and $B_0$ input from the outside through an input terminal IN2 and outputs intersection point to the first comparator 162, in order to perform step 30 shown in FIG. 5. The intersection point $(R_3, G_3, B_3)$ may be output to the incremental rate calculator 142 through an output terminal OUT2.

The intersection calculator 160 includes a first maximum extractor 170, a first divider 172, and a first multiplier 174. Here, the first maximum extractor 170 extracts a maximum value among the input color components $R_0$, $G_0$, and $B_0$ input through the input terminal IN2 and outputs the extracted maximum value to the first divider 172. The first divider 172 divides the maximum value $k_1$ in the possible range of the brightness of any of the input color component $R_0$, $G_0$, and $B_0$ by the maximum value input from the first maximum extractor 170 and outputs the results of the dividing to the first multiplier 174. The first multiplier 174 multiplies the results of the dividing which are input from the first divider 172 by the input color components $R_0$, $G_0$, and $B_0$ and outputs the results of the multiplication as intersection point $(R_3, G_3, B_3)$. In short, the intersection point calculator 160 calculates the intersection point defined by Equation (3).

The first comparator 162 compares the intersection point $(R_3, G_3, B_3)$ input from the intersection point calculator 160 with a first threshold value and outputs the result of the comparison to the incremental rate calculator 142 as the first control signal C1, in order to perform step 32.

Figure 11:
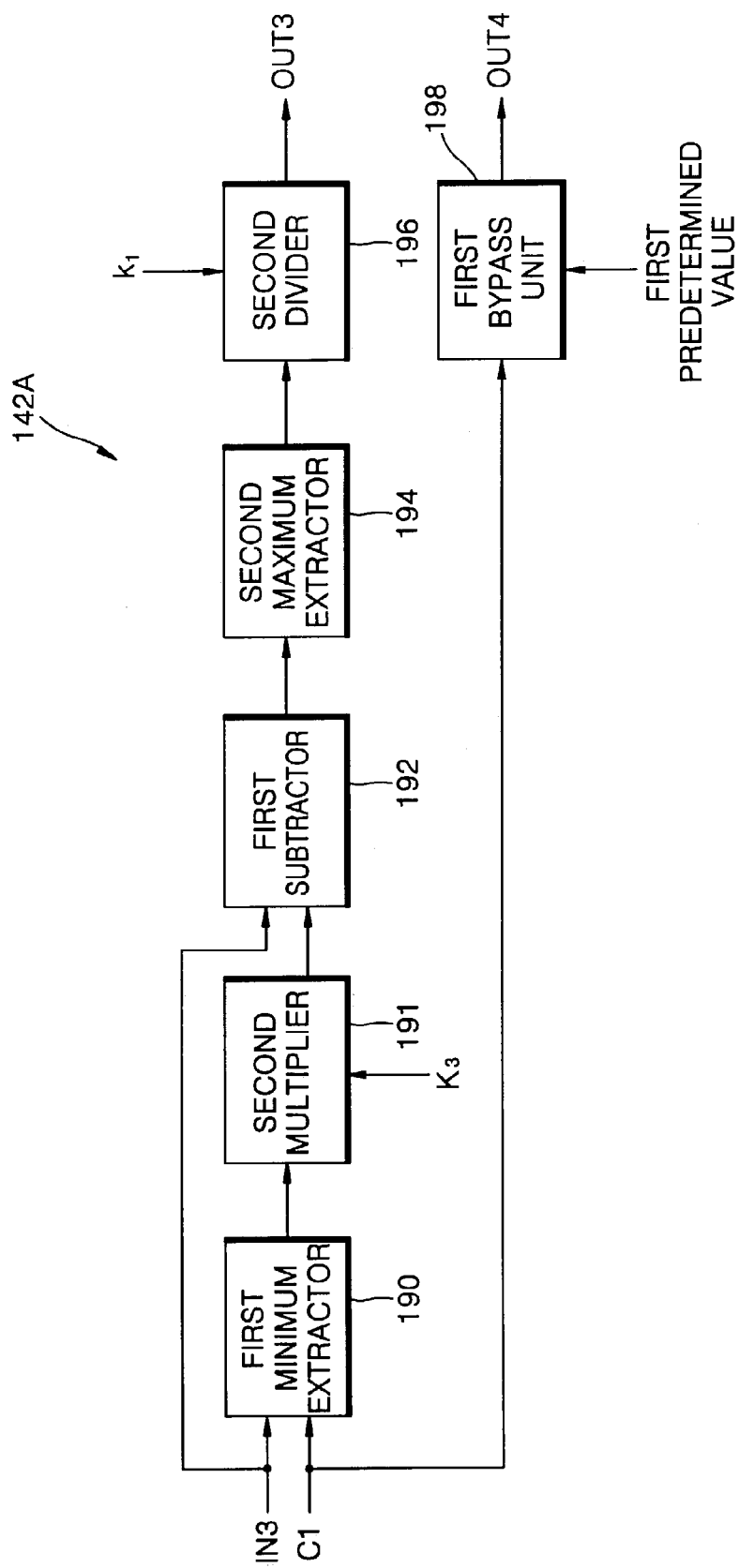
FIG. 11 is a block diagram of a preferred embodiment of the incremental rate calculator shown in FIG. 9 according to the present invention.

FIG. 11 is a block diagram of a preferred embodiment 142A of the incremental rate calculator 142 shown in FIG. 9 according to the present invention. The incremental rate calculator 142A includes a first minimum extractor 190, a second multiplier 191, a first subtractor 192, a second maximum extractor 194, a second divider 196, and a first bypass unit 198.

Referring to FIG. 11, the first minimum extractor 190, the second multiplier 191, and the first subtractor 192 perform step 36 shown in FIG. 5, which is expressed by Equation (6). Here, the first minimum extractor 190 extracts a minimum value among the coordinates of the intersection point $(R_3, G_3, B_3)$ input through an input terminal IN3, in response to the first control signal C1 input from the region determining unit 140 and outputs the extracted minimum value to the second multiplier 191. The first minimum extractor 190 may receive the intersection point $(R_3, G_3, B_3)$ from the region determining unit 140 shown in FIG. 10, for example, the intersection point calculator 160. Alternatively, the first minimum extractor 190 may calculate the intersection point $(R_3, G_3, B_3)$ using the input color components $R_0$, $G_0$, and $B_0$ input from the outside through the input terminal IN3. The first minimum extractor 190 extracts a minimum value among the coordinates of the intersection point $(R_3, G_3, B_3)$ only when at least one of the coordinates of the intersection point $(R_3, G_3, B_3)$ is determined smaller than a first threshold value in response to the first control signal C1. In other words, when perceiving through the first control signal C1 that none of the coordinates of the intersection point $(R_3, G_3, B_3)$ is smaller than the first threshold value, the first minimum extractor 190 does not extract the minimum value among the coordinates of the intersection point $(R_3, G_3, B_3)$. The second multiplier 191 multiplies the minimum value input from the first minimum extractor 190 by the available light quantity incremental rate $K_3$ input from the outside and outputs the result of the multiplication to the first subtractor 192. The first subtractor 192 subtracts the output of the second multiplier 191 from each of the coordinates of the intersection point $(R_3, G_3, B_3)$ and outputs the results of the subtraction to the second maximum extractor 194.

If the available light quantity incremental rate $K_3$ is set to 1, the incremental rate calculator 142A shown in FIG. 11 may not include the second multiplier 191, in which case the first subtractor 192 subtracts the minimum value input from the first minimum extractor 190 from each of the coordinates of the intersection point $(R_3, G_3, B_3)$ and outputs the results of the subtraction to the second maximum extractor 194.

The second maximum extractor 194 and the second divider 196, which are shown in FIG. 11, perform step 38 shown in FIG. 5, which is expressed by Equation (7). Here, the second maximum extractor 194 extracts a maximum value among the outputs $R_4$, $G_4$, and $B_4$ of the first subtractor 192 and outputs the extracted maximum value to the second divider 196. The second divider 196 divides the maximum value $k_1$ in the possible range of the brightness of any of the input color components $R_0$, $G_0$, and $B_0$ by the maximum value input from the second maximum extractor 194 and outputs the result of the division to the incremental value calculator 144 as the level incremental rate $S_1$ through an output terminal OUT3.

The first bypass unit 198 outputs a first predetermined value as the level incremental rate $S_1$ through an output terminal OUT4 in response to the first control signal C1 input from the region determining unit 140, in order to perform step 34. For example, when perceiving through the first control signal C1 that none of the coordinates of intersection point $(R_3, G_3, B_3)$ is smaller than the first threshold value through the first control signal C1, the first bypass unit 198 outputs the first predetermined value as the level incremental rate $S_1$ through an output terminal OUT4.

Figure 12:
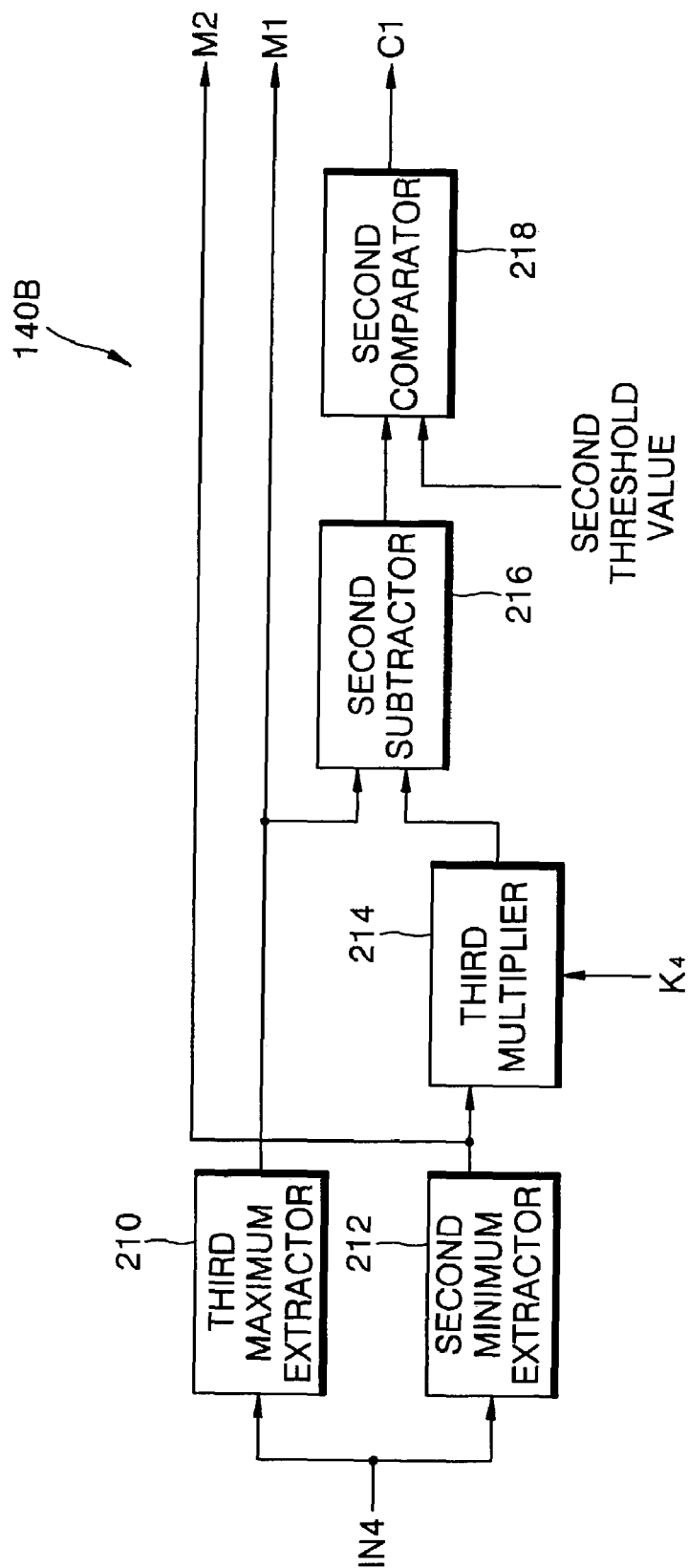
FIG. 12 is a block diagram of another preferred embodiment of the region determining unit shown in FIG. 9 according to the present invention.

FIG. 12 is a block diagram of another preferred embodiment 140B of the region determining unit 140 shown in FIG. 9 according to the present invention. The region determining unit 140B includes a third maximum extractor 210, a second minimum extractor 212, a third multiplier 214, a second subtractor 216, and a second comparator 218.

The region determining unit 140B shown in FIG. 12 performs steps 50 through 54 shown in FIG. 6. In particular, the third maximum extractor 210 extracts a maximum value M1 among the input color components $R_0$, $G_0$, and $B_0$ input from the outside through an input terminal IN4, and the second minimum extractor 212 extracts a minimum value M2 among the input color components $R_0$, $G_0$, and $B_0$, in order to perform step 50 shown in FIG. 6. The third multiplier 214 and the second subtractor 216 are provided for performing step 52 shown in FIG. 6. Here, the third multiplier 214 multiplies the minimum value M2 input from the second minimum extractor 212 by the first predetermined value $K_4$ and outputs the result of the multiplication to the second subtractor 216. The second subtractor 216 subtracts the output of the third multiplier 214 from the maximum value M1 input from the third maximum extractor 210 and outputs the result of the subtraction to the second comparator 218. The second comparator 218 compares the result of the subtraction input from the second subtractor 216 with a second threshold value and outputs the result of the comparison to the incremental rate calculator 142 as the first control signal C1, in order to perform step 54.

Figure 13:
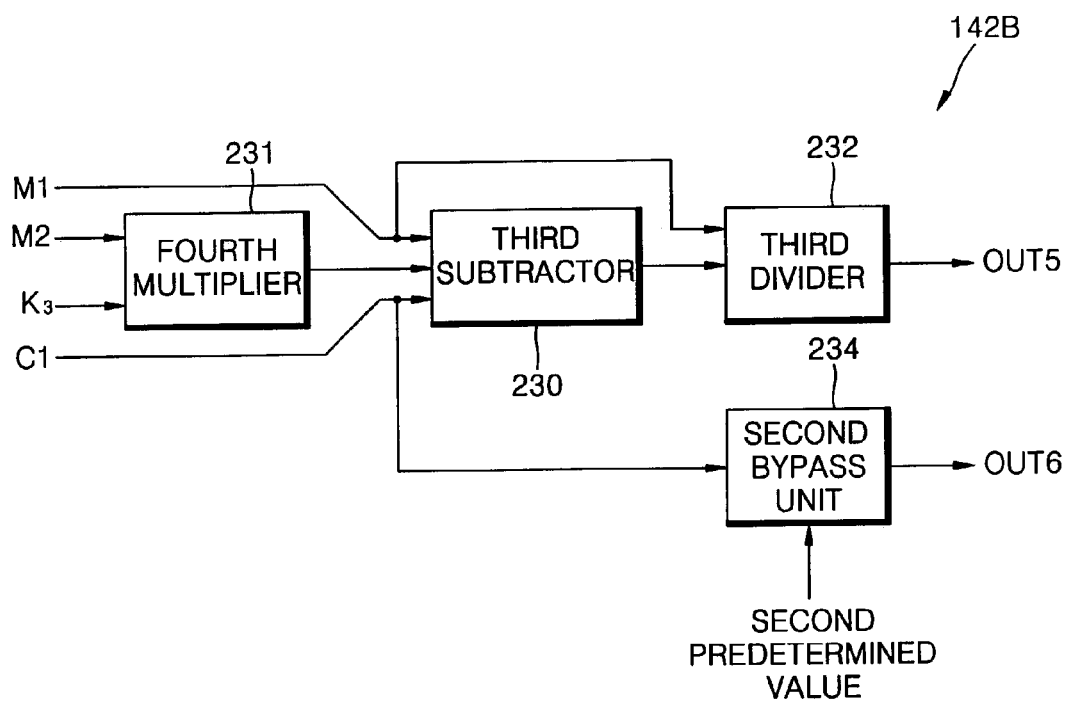
FIG. 13 is a block diagram of another preferred embodiment of the incremental rate calculator shown in FIG. 9 according to the present invention.

FIG. 13 is a block diagram of another preferred embodiment 142B of the incremental rate calculator 142 of FIG. 9 according to the present invention. The incremental rate calculator 142B includes a fourth multiplier 231, a third subtractor 230, a third divider 232, and a second bypass unit 234.

The fourth multiplier 231, the third subtractor 230, and the third divider 232 are provided for performing step 56 shown in FIG. 6 which is expressed by Equation (8). Here, the fourth multiplier 231 multiplies the minimum value M2 input from the region determining region 140 by the available light quantity incremental rate $K_3$ input from the outside and outputs the result of the multiplication to the third subtractor 230. The third subtractor 230 subtracts the output of the fourth multiplier from the maximum value M1 in response to the first control signal C1 input from the region determining region 140 and outputs the result of the subtraction to the third divider 232. Here, the maximum value M1 and the minimum value M2 may be input from the region determining region 140 of FIG. 9, for example, the third maximum extractor 210 and the second minimum extractor 212 shown in FIG. 12, respectively, to the third subtractor 230. Alternatively, the maximum value M1 and the minimum value M2 may be generated from the input color components $R_0$, $G_0$, and $B_0$ input from the outside through the input terminal IN1 by the incremental rate calculator 142 and then input into the third subtractor 230.

When the variable light quantity incremental rate $K_3$ is 1, the incremental rate calculator 142B shown in FIG. 13 does not need to include the fourth multiplier 231, in which case the third subtractor 230 subtracts the minimum value M2 from the maximum value M1 in response to the first control signal C1 input from the region determining unit 140 and outputs the result of the subtraction to the third divider 232.

The third divider 232 divides the maximum value M1 among the input color components $R_0$, $G_0$, and $B_0$ by the output of the third subtractor 230 and outputs the result of the dividing to the incremental value calculator 144 as the level incremental rate $S_1$ through an output terminal OUT5. The second bypass unit 234 which performs step 58 outputs the second predetermined value $K_4$ to the incremental value calculator 144 as the level incremental rate $S_1$ through an output terminal OUT6 in response to the first control signal C1 input from the region determining unit 140. For example, when perceiving through the first control signal C1 that the result of subtracting the minimum value M2 multiplied by $K_4$ from the maximum value M1 is not greater than the second threshold value, the second predetermined value $K_4$ is output to the incremental value calculator 144 as the level incremental rate $S_1$ through the output terminal OUT6.

The apparatus for changing the brightness of an image shown in FIG. 9 may not include the region determining unit 140, in which case the incremental rate calculator 142 calculates the level incremental rate $S_1$ using the available light quantity incremental rate $K_3$ and the input color components input through the input terminal IN1, in order to perform step 12.

In order to perform step 14 shown in FIG. 4, the incremental value calculator 144 scales the input color components $R_0$, $G_0$, and $B_0$ input from the outside through the input terminal IN1 according to the level incremental rate $S_1$ input from the incremental rate calculator 142 and outputs the result of the scaling to the fourth color component value calculator 146 as the incremental values $R_2$, $G_2$, and $B_2$ of the input color components $R_0$, $G_0$, and $B_0$.

Figure 14:
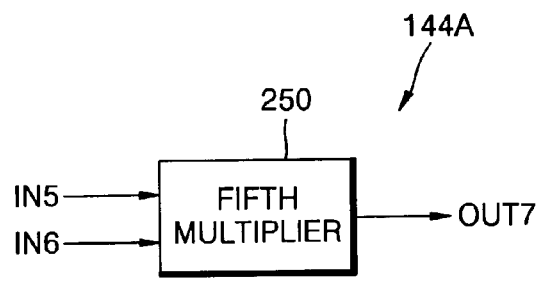
FIG. 14 is a block diagram of the increase value calculator shown in FIG. 9 according to the present invention.

FIG. 14 is a block diagram of a preferred embodiment 144A of the incremental value calculator 144 shown in FIG. 9 according to the present invention. The incremental value calculator 144A includes a fifth multiplier 250.

The fifth multiplier 250 multiplies the level incremental rate $S_1$ input from the incremental rate calculator 142 through an input terminal IN5 by each of the input color components $R_0$, $G_0$, and $B_0$ input from the outside through an input terminal IN6 and outputs the results of the multiplication as the incremental values $R_2$, $G_2$, and $B_2$. In other words, the fifth multiplier 250 of the incremental value calculator 144A calculates the incremental values $R_2$, $G_2$, and $B_2$, as shown in Equation (9).

In order to perform step 16, the fourth color component value calculator 146 calculates the fourth color component value $W_{out}$ using the incremental values $R_2$, $G_2$, and $B_2$ input from the incremental value calculator 144 and outputs the fourth color component value $W_{out}$ to the output color component calculator 148.

Figure 15:
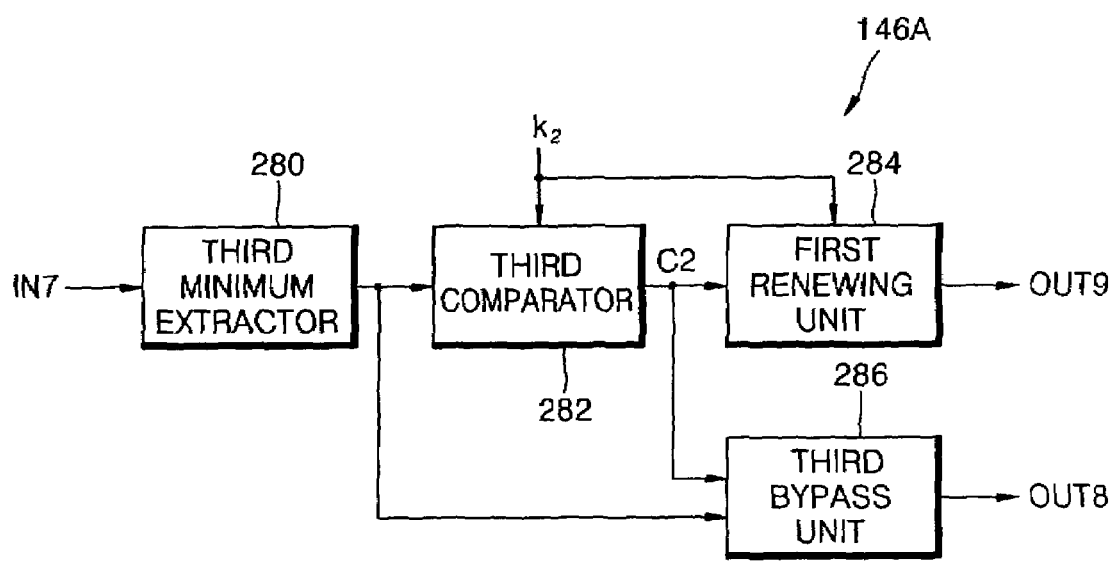
FIG. 15 is a block diagram of the fourth color component value calculator shown in FIG. 9 according to the present invention.

FIG. 15 is a block diagram of an embodiment 146A of the fourth color component value calculator 146 shown in FIG. 9 according to the present invention. The fourth color component value calculator 146A shown in FIG. 15 includes a third minimum extractor 280, a third comparator 282, a first renewing unit 284, and a third bypass unit 286.

In order to perform step 90 shown in FIG. 7, the third minimum extractor 280 extracts a minimum value among the incremental values $R_2$, $G_2$, and $B_2$ input from the incremental value calculator 144 through an input terminal IN7 and outputs the extracted minimum value to the third comparator 282 and the third bypass unit 286. In order to perform 92 step shown in FIG. 7, the third comparator 282 compares the minimum value input from the third minimum extractor 280 with the maximum value $k_2$ in the possible range of the brightness of the fourth color component and outputs the result of the comparison to the first renewing unit 284 and the third bypass unit 286 as the second control signal C2. The third bypass unit 286 bypasses the minimum value input from the third minimum extractor 280 in response to the second control signal C2 input from the third comparator 282 and outputs the minimum value to the output color component calculator 148 as the fourth color component through an output terminal OUT8. In other words, when perceiving through the second control signal C2 input from the third comparator 282 that the fourth color component value $W_{out}$ is not greater than $k_2$, the third bypass unit 286 bypasses the minimum value input from the third minimum extractor 280 and outputs the bypassed minimum value to the output color component calculator 148 as the fourth color component through the output terminal OUT8.

In order to perform step 94 shown in FIG. 7, the first renewing unit 284 renews the fourth color component value to be equal to the maximum value $k_2$ in the possible range of the brightness of the fourth color component and outputs the renewed fourth color component value $W_{out}$ to the output color component calculator 148 through the output terminal OUT9 in response to the second control signal C2 input from the third comparator 282. In other words, when perceiving through the second control signal C2 that the fourth color component value is considered greater than $k_2$, the first renewing unit 284 renews the fourth color component value to be equal to $k_2$ and outputs the renewed fourth color component value $W_{out}$ to the output color component calculator 148 through the output terminal OUT9.

Figure 16:
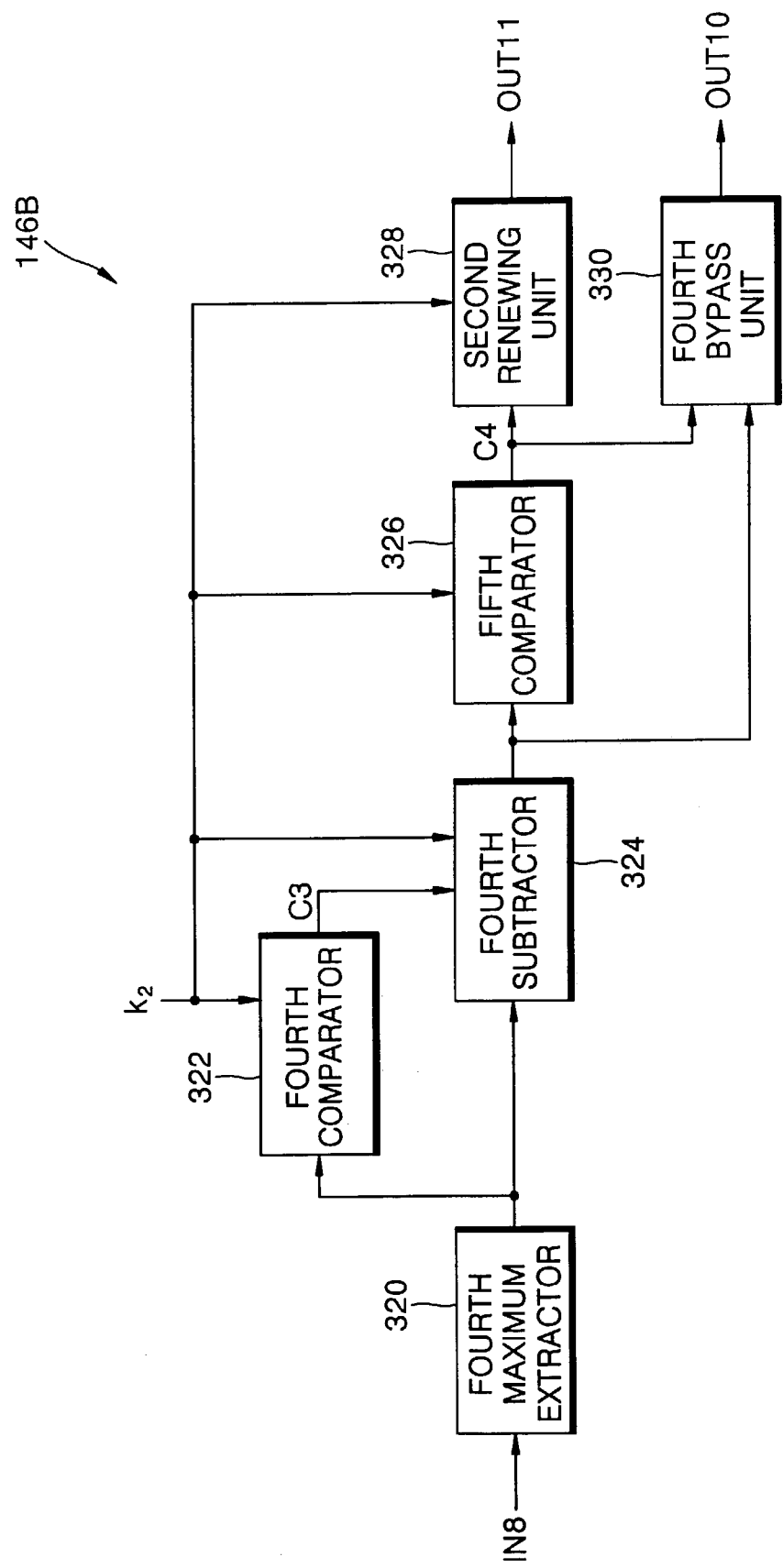
FIG. 16 is a block diagram of another preferred embodiment of the fourth color component value calculator shown in FIG. 9 according to the present invention.

FIG. 16 is a block diagram of another embodiment 146B of the fourth color component value calculator 146 shown in FIG. 9 according to the present invention. The fourth color component value calculator 146B shown in FIG. 16 includes a fourth maximum extractor 320, a fourth comparator 322, a fourth subtractor 324, a fifth comparator 326, a second renewing unit 328, and a fourth bypass unit 330.

The fourth maximum extractor 320, the fourth comparator 322, and the fourth subtractor 324 are provided for performing step 90 shown in FIG. 7. Here, the fourth maximum extractor 320 extracts a maximum value among the incremental values $R_2$, $G_2$, and $B_2$ input from the incremental value calculator 144 through an input terminal IN8, determines the extracted maximum value as the fourth color component value, and outputs the fourth color component value to the fourth comparator 322 and the fourth subtractor 324. The fourth comparator 322 compares the maximum value input from the fourth maximum extractor 320 with the maximum value $k_2$ in the possible range of the brightness of the fourth color component to see if it is greater than $k_2$, i.e., the third threshold value, and outputs the result of the comparison to the fourth subtractor 324 as the third control signal C3. If perceiving through the third control signal C3 input from the fourth comparator 322 that the maximum value input from the fourth maximum extractor 320 turns out to be greater than the third threshold value, the fourth subtractor 324 subtracts $k_2$ from the maximum value input from the fourth maximum extractor 320 and outputs the result of the subtraction to the fifth comparator 326. On the other hand, if perceiving through the third control signal C3 that the output of the fourth maximum extractor 320 is not greater than the third threshold value, the fourth subtractor 324 outputs '0' to the fifth comparator 326. For example, the fourth subtractor 324 subtracts the maximum value $k_2$ from the maximum value $k_2$, and outputs the result of the subtraction to the fifth comparator 326.

The fifth comparator 326 and the fourth bypass unit 330 are provided for performing step 92 shown in FIG. 7. Here, the fifth comparator 326 compares the output of the fourth subtractor 324 with the maximum value $k_2$ in the possible range of the brightness of the fourth color component and outputs the result of the comparison to the second renewing unit 328 and the fourth bypass unit 330 as the fourth control signal C4. If the output of the fourth subtractor 324 is greater than $k_2$, the fifth comparator 326 generates the fourth control signal C4 so as to enable the second renewing unit 328. On the other hand, if the output of the fourth subtractor 324 is not greater than $k_2$, the fifth comparator 326 generates the fourth control signal C4 so as to enable the fourth bypass unit 330. The fourth bypass unit 330 which is enabled in response to the fourth control signal C4 input from the fifth comparator 326 bypasses the output of the fourth subtractor 324 and outputs the result of the bypassing to the output color component calculator 148 as a fourth color component value through an output terminal OUT10.

In order to perform step 94 shown in FIG. 7, the second renewing unit 328 which is enabled in response to the fourth control signal C4 input from the fifth comparator 326 renews the fourth color component to be equal to the maximum value $k_2$ in the possible range of the brightness of the fourth color component and outputs the renewed fourth color component value to the output color component calculator 148 through an output terminal OUT11.

Figure 17:
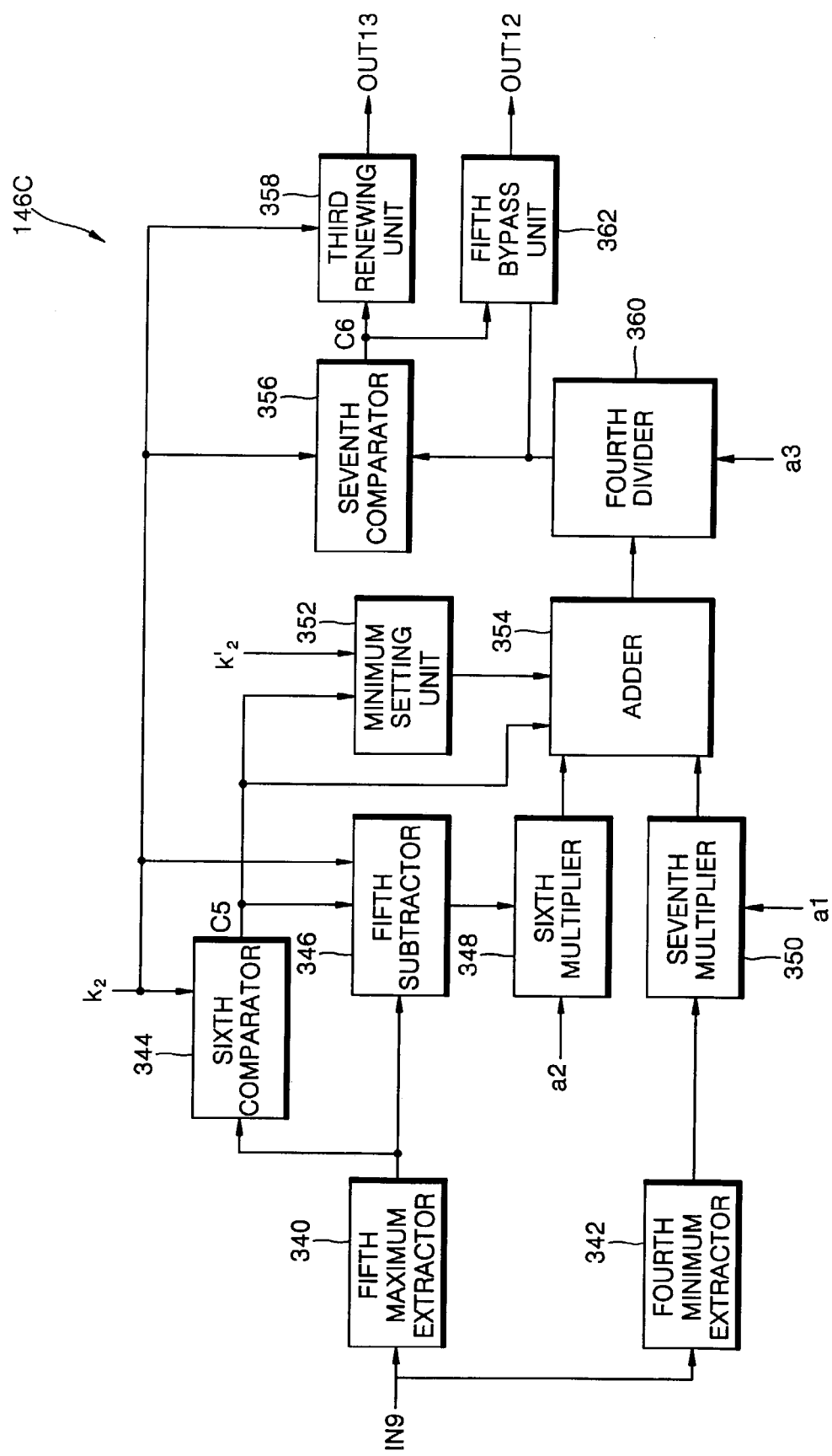
FIG. 17 is a block diagram of another preferred embodiment of the fourth color component value calculator according to the present invention.

FIG. 17 is a block diagram of another embodiment 146C of the fourth color component value calculator 146 shown in FIG. 9 according to the present invention. The fourth color component value calculator 146C shown in FIG. 17 includes a fifth maximum extractor 340, a fourth minimum extractor 342, a sixth comparator 344, a fifth subtractor 346, a sixth multiplier 348, a seventh multiplier 350, a minimum setting unit 352, an adder 354, a seventh comparator 356, a third renewing unit 358, a fourth divider 360, and a fifth bypass unit 362.

The fifth maximum extractor 340, the fourth minimum extractor 342, the sixth comparator 344, the fifth subtractor 346, the sixth multiplier 348, the seventh multiplier 350, the minimum setting unit 352, the adder 354, and the fourth divider 360 are provided for performing step 90 shown in FIG. 7. Here, the fifth maximum extractor 340 extracts a maximum value among the incremental values $R_2$, $G_2$, and $B_2$ input from the incremental value calculator 144 through the input terminal IN9 and outputs the extracted maximum value to the sixth comparator 344 and the fifth subtractor 346. The sixth comparator 344 compares the output of the fifth maximum comparator 340 with the maximum value $k_2$ in the possible range of the brightness of the fourth color component to see if it is greater than $k_2$, i.e., the third threshold value, and outputs the result of the comparison to the fifth subtractor 346, the minimum setting unit 352, and the adder 354 as the fifth control signal C5. If the maximum value output from the fifth maximum extractor 340 is greater than the third threshold value, the sixth comparator 344 generates the fifth control signal C5 so as to enable the fifth subtractor 346. On the other hand, if the maximum value is no greater than the third threshold value, the sixth comparator 344 generates the fifth control signal C5 so as to enable the minimum setting unit 352. The minimum setting unit 352 which is enabled in response to the fifth control signal C5 outputs a minimum value $k_2$ in the possible range of the fourth color component, for example, 0, to the adder 354. The fifth subtractor 346 which is enabled in response to the fifth control signal C5 input from the sixth comparator 344 subtracts $k_2$ from the maximum value input from the fifth maximum extractor 340 and outputs the result of the subtraction to the sixth multiplier 348. The sixth multiplier 348 multiplies the output of the fifth subtractor 346 by the coefficient $a_2$ and outputs the result of the multiplication to the adder 354. The fourth minimum extractor 342 extracts a minimum value among the incremental values $R_2$, $G_2$, and $B_2$ input from the incremental value calculator 144 through the input terminal IN9 and outputs the extracted minimum value to the seventh multiplier 350. The seventh multiplier 350 multiplies the output of the fourth minimum extractor 342 by the coefficient $a_1$ and outputs the result of the multiplication to the adder 354. The adder 354 adds either the output of the sixth multiplier 348 or the output of the minimum setting unit 352 to the output of the seventh multiplier 350 and outputs the result of the adding to the fourth divider 360. In other words, if perceiving through the fifth control signal C5 that the output of the fifth maximum extractor 340 turns out to be greater than the third threshold value, the adder 354 adds the output of the sixth multiplier 348 to the output of the seventh multiplier 350. On the other hand, if the output of the fifth maximum extractor 340 turns out to be not greater than the third threshold value according to the fifth control signal C5, the adder 354 adds the output of the minimum setting unit 352 to the output of the seventh multiplier 350.

According to the present invention, the fourth color component value calculator 146C may not include the sixth and seventh multipliers 348 and 350 shown in FIG. 17, in which case the adder 354 adds either the output of the fifth subtractor 346 or the output of the minimum setting unit 352 to the output of the fourth minimum extractor 342 and outputs the result of the adding to the fourth divider 360.

The fourth divider 360 divides the output of the adder 354 by the coefficient $a_3$ and outputs the result of the division to the seventh comparator 356 and the fifth bypass unit 362.

The seventh comparator 356 and the fifth bypass unit 362 are provided for performing step 92. In particular, the seventh comparator 356 compares the output of the fourth divider 360 with the maximum value $k_2$ in the possible range of the brightness of the fourth color component and outputs the result of the comparison to the third renewing unit 358 and the fifth bypass unit 362 as the sixth control signal C6. If the output of the fourth divider 360 is greater than the third threshold value, the seventh comparator 356 generates the sixth control signal C6 so as to enable the third renewing unit 358. On the other hand, if the output of the fourth divider 360 is not greater than the third threshold value, the seventh comparator 356 generates the sixth control signal C6 so as to enable the fifth bypass unit 362. The fifth bypass unit 362 which is enabled in response to the sixth control signal C6 input from the seventh comparator 356 bypasses the output of the fourth divider 360 and outputs the result of the bypassing to the output color component calculator 148 as a fourth color component value through an output terminal OUT12.

In order to perform step 94, the third renewing unit 358 which is enabled in response to the sixth control signal C6 input from the seventh comparator 356 renews the fourth color component value to be equal to the third threshold value, i.e., the maximum value $k_2$ in the possible range of the brightness of the fourth color component, and outputs the renewed fourth color component value to the output color component calculator 148 through an output terminal OUT13.

In order to perform step 18, the output color component calculator 148 shown in FIG. 9 calculates the output color components $R_{out}$, $G_{out}$, and $B_{out}$, the brightnesses of which are increased from those of the input color components $R_0$, $G_0$, and $B_0$, using the incremental values $R_2$, $G_2$, and $B_2$ input from the incremental value calculator 144 and the fourth color component value $W_{out}$ input from the fourth color component value calculator 146. Then, the output color component calculator 148 outputs the output color components $R_{out}$, $G_{out}$, and $B_{out}$ through an output terminal OUT1.

Figure 18:
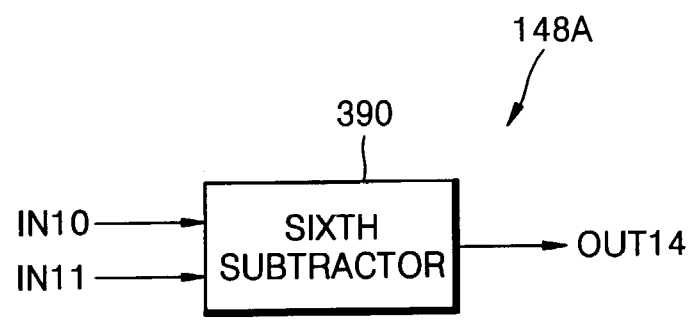
FIG. 18 is a block diagram of a preferred embodiment of the output color component calculator shown in FIG. 9 according to the present invention.

FIG. 18 is a block diagram of a preferred embodiment 148A of the output color component calculator 148 shown in FIG. 9 according to the present invention. The output color component calculator 148A shown in FIG. 18 includes a sixth subtractor 390.

The sixth subtractor 390 subtracts the fourth color component value $W_{out}$, which is input from the fourth color component value calculator 146, from each of the incremental values $R_2$, $G_2$, and $B_2$ input from the incremental value calculator 144 through an input terminal IN10 and outputs the result of the subtraction as the output color components $R_2$, $G_2$, and $B_2$ through an output terminal OUT14. In other words, the sixth subtractor 390 calculates the output color components $R_{out}$, $G_{out}$, and $B_{out}$, as shown in Equation (12).

Figure 19:
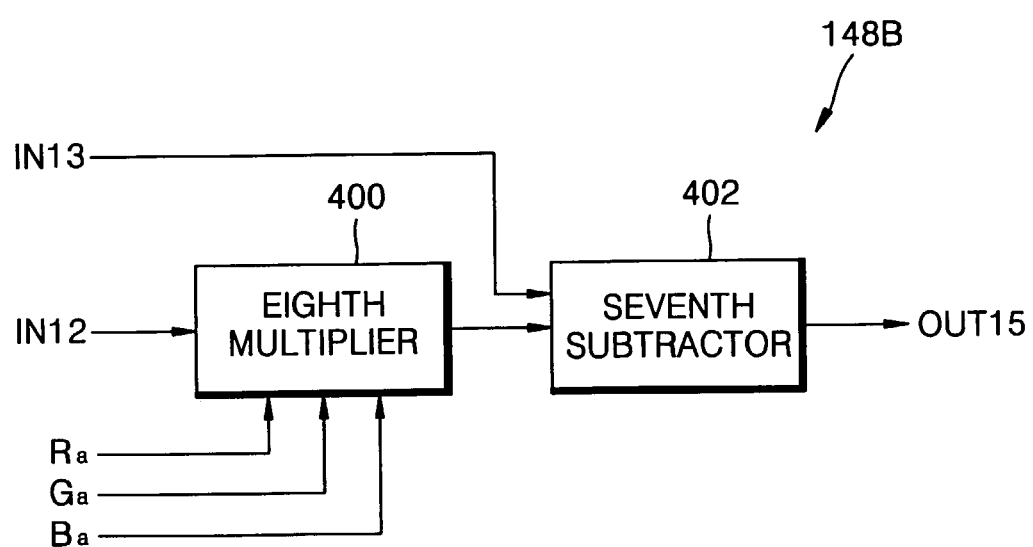
FIG. 19 is a block diagram of another preferred embodiment of the output color component calculator shown in FIG. 9 according to the present invention.

FIG. 19 is a block diagram of another embodiment 148B of the output color component calculator 148 of FIG. 9 according to the present invention. The output color component calculator 148B shown in FIG. 19 includes an eighth multiplier 400 and a seventh subtractor 402.

In order to perform step 110 shown in FIG. 8, the eighth multiplier 400 multiplies the mixture ratios $R_a$, $G_a$, and $B_a$ of the input color components by the fourth color component value $W_{out}$ input from the fourth color component value calculator 146 through an input terminal IN12 and outputs the results of the multiplication to the seventh subtractor 402. In order to perform step 112 shown in FIG. 8, the seventh subtractor 402 subtracts the output of the eight multiplier 400 from each of the incremental values $R_2$, $G_2$, and $B_2$ input from the incremental value calculator 144 through an input terminal IN13 and outputs the results of the subtraction as the output color components $R_{out}$, $G_{out}$, and $B_{out}$ through an output terminal OUT15.

In short, the apparatus for changing the brightness of an image according to the present invention, which is shown in FIG. 9, receives the three input color components $R_0$, $G_0$, and $B_0$ through the input terminal IN1 and outputs the four output color components $R_{out}$, $G_{out}$, $B_{out}$, and $W_{out}$ through the output terminal OUT1.

As described above, in the method and the apparatus for changing the brightness of an image according to the present invention, the rate of increasing the brightness of an image is adaptively adjusted depending on input color components in consideration of a color gamut where the input color components belong.

Accordingly, it is possible to prevent input color components from being clipped and to solve the decrease in the saturation of an image, which is caused when increasing the brightness of an output image, by adding a fourth color component to three conventional color components. Therefore, it is possible to obtain an output image having an increased brightness, while maintaining the hue and saturation of the image to be the same as those of the input color components. In addition, it is possible to easily convert three input color components into four output color components using a simple method.

What is claimed is:

1. A method for changing the brightness of an image, comprising:
   (a) calculating a level incremental rate, which denotes the degree to which the brightnesses of three input color components, i.e., first, second and third color components, will be increased according to a color gamut to which a fourth color component belongs;
   (b) scaling the three input color components using the level incremental rate and determining the results of the scaling as incremental values of the three input color components;
   (c) obtaining the fourth color component value using the incremental values; and
   (d) obtaining output color components, the brightness of which are increased from those of the three input color components, using the fourth color component value and the incremental values,
   wherein the level incremental rate is not greater than a first predetermined value.

2. The method of claim 1 further comprising (e) determining a region to which the three input color components belong, in a color gamut comprised of two or more regions and moving on to step (a),
   wherein in step (a), the level incremental rate is determined according to the determined region.

3. The method of claim 2, wherein steps (a) and (e) are performed using a light quantity incremental rate, which can be changed in advance.

4. The method of claim 3, wherein step (e) comprises:
obtaining an intersection point of an extended line of input vector representing the three input color components and the boundary of the color gamut; and
determining whether or not at least one of the coordinates of the intersection point is smaller than a first threshold value, and the input color components are considered as belonging to an unfixed first scaling space if the at least one of the coordinates is smaller than the first threshold value or considered as belonging to a fixed second scaling space if the at least one of the coordinates is no smaller than the first threshold value.

5. The method of claim 4, wherein the first threshold value is determined by an available light quantity incremental rate which denotes a maximum or a minimum value among component light quantity incremental rates of the light quantity incremental rate.

6. The method of claim 4, wherein step (a) comprises:
(a1) multiplying a minimum value among the coordinates of the intersection point by an available light quantity incremental rate which denotes a maximum or a minimum value among component light quantity incremental rates of the light quantity incremental rate if the at least one of the coordinates is smaller than the first threshold value and subtracting the result of the multiplication from each of the coordinates of the intersection point;
(a2) dividing a maximum value in the possible range of the brightness of any of the three input color components by a maximum value among the results of the subtraction obtained in step (a1), determining the result of the division as the level incremental rate, and moving on to step (b); and
(a3) determining a first predetermined value as the level incremental rate if none of the coordinates of the intersection point is smaller than the first threshold value and moving on to step (b).

7. The method of claim 6, wherein the first predetermined value is the sum of the available light quantity incremental rate and 1.

8. The method of claim 4, wherein the first threshold value can be defined by the following equation:

$$\text{First threshold value} = \frac{k_1}{1 + K_3},$$

wherein $K_3$ represents the available light quantity incremental rate corresponding to a maximum or a minimum among the component light quantity incremental rates, the light quantity incremental rate is represented by the component light quantity incremental rates of the color components, and $k_1$ represents the maximum value in the possible range of the brightness of any of the input color components.

9. The method of claim 4, wherein the coordinates of the intersection point are defined by the following equations:

$$R_3 = \frac{k_1}{M_1} \times R_0, \ G_3 = \frac{k_1}{M_1} \times G_0, \ B_3 = \frac{k_1}{M_1} \times B_0,$$

wherein $R_0$, $G_0$, and $B_0$ represent the input color components, $M_1$ represents to a maximum value among $R_0$, $G_0$, and $B_0$, and $k_1$ represents the maximum value in the possible range of the brightness of any of $R_0$, $G_0$, and $B_0$.

10. The method of claim 3, wherein step (e) comprises:
extracting maximum and minimum values among the three input color components;
multiplying the minimum value by a first predetermined value and subtracting the result of the multiplication from the maximum value; and
determining whether or not the result of the subtraction is greater than a second threshold value,
wherein the three input color components are considered as belonging to an unfixed first scaling space if the result of the subtraction is greater than the second threshold value or are considered as belonging to a fixed second scaling space if the result of the subtraction is not greater than the second threshold value.

11. The method of claim 10, wherein step (a) comprises:
(a1) if the result of the subtraction is greater than the second threshold value, multiplying an available light quantity incremental rate corresponding to a maximum or a minimum among the component light quantity incremental rates of the light quantity incremental rate by the minimum value among the input color components, subtracting the result of the multiplication from the maximum value among the input color components, calculating the ratio of the maximum value to the result of the subtraction, determining the calculated ratio as the level incremental rate, and moving on to step (b); and
(a2) if the result of the subtraction is not greater than the second threshold value, determining the second threshold value as the level incremental rate and moving on to step (b).

12. The method of claim 10, wherein the second predetermined value is the sum of the available light quantity incremental rate and 1.

13. The method of claim 3, wherein after step (a), step (b) comprises multiplying each of the three input color components by the level incremental rate, determining the results of the multiplication as the incremental values, and moving on to step (c).

14. The method of claim 3, wherein step (c) comprises:
(c1) after step (b), determining a certain value related to the incremental values as the fourth color component value;
(c2) determining whether or not the certain value determined in step (c1) is greater than the third threshold value and moving on to step (d) if the certain value is not greater than the third threshold value; and
(c3) renewing the fourth color component value to be equal to the third threshold value if the certain value determined in step (c1) is greater than the third threshold value and moving on to step (d),
wherein the third threshold value denotes a maximum value in the possible range of the brightness of the fourth color component and is determined by an available light quantity incremental rate corresponding to a maximum or a minimum among the component light quantity incremental rates of the light quantity incremental rate.

15. The method of claim 14, wherein the certain value related to the incremental values is a minimum value among the incremental values.

16. The method of claim 14, wherein the certain value related to the incremental values is the result of subtracting a maximum value in the possible range of the brightnesses of the three input color components from a maximum value among the incremental values.

17. The method of claim 14, wherein the certain value related to the incremental values is obtained using a minimum value among the incremental values and the result of subtracting the maximum value in the possible range of the brightnesses of the three input color components from a maximum value among the incremental values.

18. The method of claim 3, wherein after step (c), step (d) comprises subtracting the fourth color component value from each of the incremental values and determining the results of the subtraction as the output color components.

19. The method of claim 3, wherein step (d) comprises:
(d1) after step (c), multiplying the fourth color component value by mixture ratios obtained from the ratios of the light intensities of the three input color components which are obtained by vector-decomposing output light intensity of a fourth color channel by the three input color components; and
(d2) subtracting the results of the multiplication obtained in step (d1) from the incremental values and determining the results of the subtraction as the output color components.

20. An apparatus for changing the brightness of an image comprising:
an incremental rate calculator for calculating a level incremental rate, which corresponds to the degree to which the brightness of three input color components input from the outside, i.e., first, second, and third color components, will be increased, using an available light quantity incremental rate and the three input color components;
an incremental value calculator for scaling the three input color components according to the level incremental rate input from the incremental rate calculator and outputting the results of the scaling as incremental values of the input color components;
a fourth color component value calculator for calculating a fourth color component value using the incremental values input from the incremental rate calculator and outputting the fourth color component value; and
an output color component calculator for calculating output color components, the brightness of which is increased from that of the three input color components, using the incremental values and the fourth color component value and outputting the output color components,
wherein the level incremental rate is not greater than a first predetermined value.

21. The apparatus of claim 20 further comprising a region determining unit for determining, in a four-color gamut, a region to which the three input color components belong and outputting the result of the determination as a first control signal,
wherein the incremental rate calculator calculates the level incremental rate in response to the first control signal.

22. The apparatus of claim 21, wherein the region determining unit determines the region where the three input color components belong based on an available light quantity incremental rate, which denotes a maximum or minimum value among component light quantity incremental rates of the light quantity incremental rate.

23. The apparatus of claim 22, wherein the region determining unit comprises:
an intersection point calculator for calculating an intersection point of an extended line of vector representing the three input color components and the boundary of the color gamut using the three input color components; and
a first comparator for comparing the coordinates of the intersection point input from the intersection point calculator with a first threshold value and outputting the result of the comparison as the first control signal.

24. The apparatus of claim 23, wherein the intersection point calculator comprises:
a first maximum extractor for extracting a maximum value among the input color components;
a first divider for dividing a maximum value in the possible range of the brightness of any of the input color components by the maximum value input from the first maximum extractor; and
a first multiplier for multiplying the result of the dividing input from the first divider by each of the input color components and outputting the results of the multiplication as the coordinates of the intersection point.

25. The apparatus of claim 23, wherein the incremental rate calculator comprises:
a first minimum extractor for extracting a minimum value among the coordinates of the intersection point input from the intersection point calculator, in response to the first control signal;
a first subtractor for subtracting the minimum value input from the first minimum extractor from each of the coordinates of the intersection point and outputting the results of the subtraction;
a second maximum extractor for extracting a maximum value among the results of the subtraction input from the first subtractor;
a first divider for dividing a maximum value in the possible range of the brightness of any of the input color components by the maximum value input from the second maximum extractor and outputting the result of the dividing to the incremental value calculator as the level incremental rate; and
a first bypass unit for outputting a first predetermined value as the level incremental rate in response to the first control signal.

26. The apparatus of claim 25, wherein the incremental rate calculator further comprises a second multiplier for multiplying the minimum value input from the first minimum extractor by the available light quantity incremental rate input from the outside and outputs the result of the multiplication to the first subtractor and the first subtractor subtracts the result of the multiplication input from the second multiplier from each of the coordinates of the intersection point.

27. The apparatus of claim 22, wherein the region determining unit comprises:
a third maximum extractor for extracting a maximum value among the input color components;
a second minimum extractor for extracting a minimum value among the input color components;
a third multiplier for multiplying the minimum value by a first predetermined value and outputting the result of the multiplication;
a second subtractor for subtracting the result of the multiplication input from the third multiplier from the maximum value input from the third maximum extractor and outputting the result of the subtraction; and a second comparator for comparing the result of the subtraction input from the second subtractor with a second threshold value and outputting the result of the comparison as the first control signal.

28. The apparatus of claim 27, wherein the incremental rate calculator comprises:
a third subtractor for subtracting the minimum value from the maximum value in response to the first control signal and outputting the result of the subtraction;
a third divider for dividing the maximum value among the input color components by the result of the subtraction input from the third subtractor and outputting the result of the dividing as the level incremental rate; and
a second bypass unit for outputting a second predetermined value as the level incremental rate in response to the first control signal.

29. The apparatus of claim 28, wherein the incremental rate calculator further comprises a fourth multiplier for multiplying the minimum value by the available light quantity incremental rate and outputting the result of the multiplication to the third subtractor, and the third subtractor subtracts the result of the multiplication input from the fourth multiplier from the maximum value in response to the first control signal.

30. The apparatus of claim 22, wherein the incremental value calculator comprises a fifth multiplier for multiplying the level incremental rate input from the incremental rate calculator by each of the input color components and outputting the results of the multiplication as the incremental values.

31. The apparatus of claim 22, wherein the fourth color component value calculator comprises:
a third minimum extractor for extracting a minimum value among the incremental values input from the incremental value calculator and outputting the extracted minimum value;
a third comparator for comparing the minimum value input from the third minimum extractor with a maximum value in the possible range of the brightness of the fourth color component and outputting the result of the comparison as a second control signal;
a third bypass unit for bypassing the minimum value input from the third minimum extractor to the output color component calculator as the fourth color component value in response to the second control signal; and
a first renewing unit for renewing the fourth color component value to be equal to the maximum value in the possible range of the brightness of the fourth color component in response to the second control signal and outputting the renewed fourth color component value to the output color component calculator.

32. The apparatus of claim 22, wherein the fourth color component value calculator comprises:
a fourth maximum extractor for extracting a maximum value among the incremental values input from the incremental value calculator and outputting the maximum value;
a fourth comparator for comparing the maximum value input from the fourth maximum extractor with a maximum value in the possible range of the brightness of the fourth color component and outputting the result of the comparison as a third control signal;
a fourth subtractor for subtracting the maximum value in the possible range of the brightness of the fourth color component from the maximum value input from the fourth maximum extractor or the maximum value in the possible range of the brightness of the fourth color component, in response to the third control signal, and outputting the result of the subtraction;
a fifth comparator for comparing the result of the subtraction input from the fourth subtractor with the maximum value in the possible range of the brightness of the fourth color component and outputting the result of the comparison as a fourth control signal;
a fourth bypass unit for bypassing the result of the subtraction input from the fourth subtractor as the fourth color component value in response to the fourth control signal input from the fifth comparator; and
a second renewing unit for renewing the fourth color component value to be equal to the maximum value in the possible range of the brightness of the fourth color component in response to the fourth control signal input from the fifth comparator and outputting the renewed fourth color component value to the output color component calculator.

33. The apparatus of claim 22, wherein the fourth color component value calculator comprises:
a fifth maximum extractor for extracting a maximum value among the incremental values input from the incremental value calculator and outputting the extracted maximum value;
a sixth comparator for comparing the maximum value input from the fifth maximum extractor with a maximum value in the possible range of the brightness of the fourth color component and outputting the result of the comparison as a fifth control signal;
a minimum setting unit for outputting a minimum value in the possible range of the brightness of the fourth color component in response to the fifth control signal input from the sixth comparator;
a fifth subtractor for subtracting the maximum value in the possible range of the brightness of the fourth color component from the extracted maximum value input from the fifth maximum extractor in response to the fifth control signal input from the sixth comparator and outputs the result of the subtraction;
a fourth minimum extractor for extracting a minimum value among the incremental values input from the incremental value calculator and outputting the extracted minimum value;
an adder for adding either the result of the subtraction input from the fifth subtractor or the minimum value input from the minimum value setting unit to the minimum value input from the fourth minimum extractor in response to the fifth control signal;
a fourth divider for dividing the result of the adding input from the adder by a predetermined first coefficient;
a seventh comparator for comparing the result of the dividing input from the fourth divider with the maximum value in the possible range of the brightness of the fourth color component and outputting the result of the comparison as a sixth control signal;
a fifth bypass unit for bypassing the result of the dividing input from the fourth divider in response to the sixth control signal input from the seventh comparator; and
a third renewing unit for renewing the fourth color component value to be equal to the maximum value in the possible range of the brightness of the fourth color component in response to the sixth control signal input from the seventh comparator and outputting the renewed fourth color component value to the output color component calculator.

34. The apparatus of claim 33, wherein the fourth color component value calculator further comprises:

a sixth multiplier for multiplying the result of the subtraction input from the fifth subtractor by a predetermined second coefficient and outputting the result of the multiplication to the adder; and a seventh multiplier for multiplying the minimum value input from the fourth minimum value extractor by a predetermined third coefficient and outputting the result of the multiplication to the adder, wherein the adder adds either the result of the multiplication input from the sixth multiplier or the minimum value input from the minimum setting unit to the result of the multiplication input from the seventh multiplier, in response to the fifth control signal.

35. The apparatus of claim 22, wherein the output color component calculator comprises a sixth subtractor for subtracting the fourth color component value from each of the incremental values and outputting the results of the subtraction as the output color components.

36. The apparatus of claim 22, wherein the output color component calculator comprises:

an eighth multiplier for multiplying mixture ratios of the input color components by the fourth color component value and outputting the results of the multiplication; and a seventh subtractor for subtracting the results of the multiplication input from the eighth multiplier from the incremental values and outputs the results of the subtraction as the output color components.

* * * * *